US012490158B2

(12) United States Patent
Yang et al.

(10) Patent No.: US 12,490,158 B2
(45) Date of Patent: Dec. 2, 2025

(54) WIRELESS NETWORK COMMUNICATION METHOD, NETWORK DEVICE, AND TERMINAL DEVICE

(71) Applicant: HUAWEI TECHNOLOGIES CO., LTD., Guangdong (CN)

(72) Inventors: Shuigen Yang, Shanghai (CN); Yinghao Jin, Shanghai (CN); Wei Tan, Shanghai (CN); Jinping Hao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 684 days.

(21) Appl. No.: 17/402,127

(22) Filed: Aug. 13, 2021

(65) Prior Publication Data

US 2021/0377833 A1    Dec. 2, 2021

Related U.S. Application Data

(63) Continuation of application No. PCT/CN2019/128939, filed on Dec. 27, 2019.

(30) Foreign Application Priority Data

Feb. 15, 2019    (CN) .......................... 201910117857.4

(51) Int. Cl.
*H04W 36/00*    (2009.01)
*H04W 36/14*    (2009.01)

(52) U.S. Cl.
CPC . *H04W 36/0094* (2013.01); *H04W 36/00838* (2023.05); *H04W 36/1443* (2023.05)

(58) Field of Classification Search
CPC ....... H04W 36/00837; H04W 36/0094; H04W 36/14; H04W 24/10
See application file for complete search history.

(56) References Cited

U.S. PATENT DOCUMENTS

2009/0163223 A1*    6/2009    Casey ................... H04W 36/22
                                                         455/453
2011/0077010 A1*    3/2011    Xu ....................... H04W 36/305
                                                         455/437

(Continued)

FOREIGN PATENT DOCUMENTS

CN    102170673 A    8/2011
CN    102984774 A    3/2013

(Continued)

OTHER PUBLICATIONS

Office Action issued in Indian Application No. 202127038579 on Mar. 23, 2022, 6 pages.

(Continued)

*Primary Examiner* — Ivan O Latorre
(74) *Attorney, Agent, or Firm* — Fish & Richardson P.C.

(57) ABSTRACT

The present disclosure discloses example wireless network communication methods and network devices. One example method includes sending a first message to a second network device by a first network device, where the first message includes measurement object information of the first network device. A second message sent by the second network device is received by the first network device, where the second message includes indication information or measurement result information of the first network device, and the indication information indicates whether an inter-system unnecessary handover of a terminal device occurs. The first network device determines, based on the second message, whether the inter-system unnecessary handover of the terminal device occurs.

28 Claims, 8 Drawing Sheets

(56) References Cited

U.S. PATENT DOCUMENTS

| | | | |
|---|---|---|---|
| 2012/0009972 A1* | 1/2012 | Viering | H04W 36/38 |
| | | | 455/525 |
| 2013/0084864 A1* | 4/2013 | Agrawal | H04W 36/00837 |
| | | | 455/436 |
| 2015/0172982 A1* | 6/2015 | Park | H04W 36/38 |
| | | | 370/332 |
| 2015/0327143 A1* | 11/2015 | Won | H04W 24/10 |
| | | | 370/332 |
| 2015/0382270 A1* | 12/2015 | Kordybach | H04L 43/16 |
| | | | 370/331 |
| 2016/0323800 A1 | 11/2016 | Ulupinar et al. | |
| 2016/0353292 A1 | 12/2016 | Centonza et al. | |
| 2018/0332520 A1* | 11/2018 | Cheng | H04W 36/302 |
| 2020/0120756 A1* | 4/2020 | Wang | H04L 5/0082 |
| 2021/0092655 A1* | 3/2021 | Zhang | H04W 36/0058 |
| 2021/0195663 A1* | 6/2021 | Da Silva | H04W 36/0058 |
| 2021/0274399 A1* | 9/2021 | Gao | H04W 36/0058 |

FOREIGN PATENT DOCUMENTS

| | | |
|---|---|---|
| CN | 103391567 A | 11/2013 |
| CN | 106162783 A | 11/2016 |
| EP | 3193534 A1 | 7/2017 |
| EP | 3618536 A1 | 3/2020 |
| EP | 3641385 A1 | 4/2020 |
| IN | 104754616 A | 7/2015 |
| WO | 2014021671 A1 | 2/2014 |
| WO | 2014127795 A1 | 8/2014 |
| WO | 2016111846 A1 | 7/2016 |

OTHER PUBLICATIONS

3GPP TS 38.300 V15.4.0 (Dec. 2018), "3rd Generation Partnership Project; Technical Specification Group Radio Access Network; NR; NR and NG-RAN Overall Description; Stage 2(Release 15)," Dec. 2018, 97 pages.

3GPP TS 36.413 V15.4.0 (Dec. 2018), "3rd Generation Partnership Project; Technical Specification Group Radio Access Network; Evolved Universal Terrestrial Radio Access Network (E-UTRAN); S1 Application Protocol (S1AP)(Release 15)," Dec. 2018, 383 pages.

Office Action issued in Chinese Application No. 201910117857.4 on Mar. 19, 2021, 23 pages (with English translation).

PCT International Search Report and Written Opinion issued in International Application No. PCT/CN2019/128939 on Apr. 1, 2020, 17 pages (with English translation).

Extended European Search Report issued in European Application No. 19915421.2 on Feb. 25, 2022, 12 pages.

EP Communication Pursuant to Article 94(3) EPC in European Appln No. 19915421.2, dated Apr. 2, 2024, 10 pages.

\* cited by examiner

WIRELESS NETWORK COMMUNICATION METHOD, NETWORK DEVICE, AND TERMINAL DEVICE

CROSS-REFERENCE TO RELATED APPLICATIONS

This application is a continuation of International Application No. PCT/CN2019/128939, filed on Dec. 27, 2019, which claims priority to Chinese Patent Application No. 201910117857.4, filed on Feb. 15, 2019. The disclosures of the aforementioned applications are hereby incorporated by reference in their entireties.

TECHNICAL FIELD

Embodiments of this application relate to the communication field, and more specifically, to a wireless network communication method, a network device, and a terminal device.

BACKGROUND

In a 5th generation (5G) mobile communication network, new radio (NR) may provide user equipment (UE) with better user experience than evolved universal terrestrial radio access (E-UTRA), for example, higher uplink and downlink peak rates and a lower control plane latency.

However, even if coverage quality of a next generation node base station (gNB) that supports NR is sufficient to provide the UE with a very good service, when the UE detects that a next generation evolved NodeB (ng-eNB) that supports E-UTRA has good signal strength, the UE is handed over from the gNB to the ng-eNB, resulting in an inter-system unnecessary handover and thereby affecting user experience. Therefore, the inter-system unnecessary handover needs to be reduced.

In a current technology, a network may determine whether to initiate a handover of the UE from the gNB to the ng-eNB, but cannot determine whether this type of handover is an inter-system unnecessary handover. Consequently, the inter-system unnecessary handover cannot be reduced.

SUMMARY

Embodiments of this application provide a wireless network communication method, a network device, and a terminal device, to enable a network to determine whether an inter-system unnecessary handover of the terminal device occurs, so that the inter-system unnecessary handover can be further reduced when it is determined that the inter-system unnecessary handover of the terminal device occurs.

According to a first aspect, a wireless network communication method is provided, and includes: A first network device sends a first message to a second network device, where the first message includes measurement object information of the first network device. The first network device receives a second message sent by the second network device, where the second message includes indication information or measurement result information that is of the first network device, and the indication information is used to indicate whether an inter-system unnecessary handover of a terminal device occurs. The first network device determines, based on the second message, whether the inter-system unnecessary handover of the terminal device occurs.

In the technical solution of this application, according to the provided wireless network communication method, after the terminal device is handed over to the second network device, the terminal device continues performing measurement on the first network device, so that a network can determine whether the inter-system unnecessary handover of the terminal device occurs. When the network determines that a system handover of the terminal device occurs, the inter-system unnecessary handover can be further reduced.

It should be understood that the measurement object information of the first network device indicates a specific object of the measurement performed on the first network device by the terminal device.

With reference to the first aspect, in a possible implementation, when the inter-system unnecessary handover of the terminal device occurs, the method further includes: The first network device adjusts an inter-system handover parameter.

If the inter-system unnecessary handover is caused by an inappropriate handover parameter set by the network, the first network device may reduce the inter-system unnecessary handover by adjusting the inter-system handover parameter, thereby improving user experience and resource utilization.

With reference to the first aspect, in a possible implementation, that the first network device adjusts an inter-system handover parameter includes: The first network device adjusts a handover policy or a first network device handover threshold.

With reference to the first aspect, in a possible implementation, that the first network device adjusts a handover policy may include: The first network device increases a priority of a handover between measurement objects of the first network device, and decreases a priority of an inter-system handover. For example, the first network device increases a priority of a handover between synchronization signal and physical broadcast channel block SSBs of the first network device.

The adjustment of the handover policy can enable the terminal device to be preferentially handed over under the first network device, thereby reducing a probability of an inter-system handover of the terminal device.

With reference to the first aspect, in a possible implementation, that the first network device adjusts a first network device handover threshold includes: increasing the first network device handover threshold.

It should be understood that the handover threshold in the embodiments of this application may be a threshold for initiating a handover preparation procedure by a network device.

Increasing the inter-system handover threshold of the first network device can reduce a probability of the inter-system handover of the terminal device.

When the inter-system unnecessary handover of the terminal device occurs, the first network device adjusts the inter-system handover parameter of the first network device, so that the inter-system unnecessary handover can be reduced, thereby improving user experience and the resource utilization.

With reference to the first aspect, in a possible implementation, that the first network device adjusts an inter-system handover parameter includes: The first network device negotiates with the second network device about changing a second network device handover threshold.

With reference to the first aspect, in a possible implementation, that the first network device negotiates with the second network device about changing a second network device handover threshold includes: The first network device sends a third message to the second network device, where the third message is used to indicate a second network device handover threshold recommended by the first network device; and the first network device receives a fourth message sent by the second network device, where the fourth message is used to indicate whether the second network device accepts the second network device handover threshold recommended by the first network device.

With reference to the first aspect, in a possible implementation, the third message includes any one of the following information:
the second network device handover threshold recommended by the first network device; a bias value of a specific cell or a specific synchronization signal and physical broadcast channel block SSB relative to an original second network device handover threshold; or an offset value of the second network device handover threshold recommended by the first network device relative to an original second network device handover threshold.

It should be understood that the information included in the third message may be used to increase the original second network device handover threshold, to reduce the probability of the inter-system handover of the terminal device.

With reference to the first aspect, in a possible implementation, when the fourth message indicates that the second network device does not accept the second network device handover threshold recommended by the first network device, the fourth message includes a handover threshold change range allowed by the second network device.

When the inter-system unnecessary handover of the terminal device occurs, the first network device negotiates with the second network about changing the second network device handover threshold, so that the inter-system unnecessary handover can be reduced, thereby improving user experience and the resource utilization.

With reference to the first aspect, in a possible implementation, that the first network device adjusts an inter-system handover parameter includes: The first network device adjusts an inter-system measurement event parameter.

With reference to the first aspect, in a possible implementation, that the first network device adjusts an inter-system measurement event parameter includes: The first network device sends a fifth message to a terminal device that camps on the first network device, where the fifth message is used to indicate an adjusted inter-system measurement event parameter.

With reference to the first aspect, in a possible implementation, the inter-system measurement event parameter includes at least one of the following information: an inter-system measurement event trigger hysteresis parameter, an inter-system neighbor cell offset amount, or an inter-system measurement event threshold.

With reference to the first aspect, in a possible implementation, the first network device may increase a value of the inter-system measurement event trigger hysteresis parameter.

With reference to the first aspect, in a possible implementation, the first network device may reduce the inter-system neighbor cell offset amount.

With reference to the first aspect, in a possible implementation, the first network device may increase the inter-system measurement event threshold.

When the inter-system unnecessary handover of the terminal device occurs, the first network device adjusts the inter-system measurement event parameter, to reduce a quantity of times for triggering an inter-system measurement event, and reduce the probability of the inter-system unnecessary handover of the terminal device, thereby improving user experience and the resource utilization.

With reference to the first aspect, in a possible implementation, the second message includes the measurement result information of the first network device, and that the first network device determines, based on the second message, whether the inter-system unnecessary handover of the terminal device occurs includes: The first network device determines whether a measurement result in the measurement result information of the first network device is not less than a quality threshold; and when the measurement result is greater than or equal to the quality threshold, the first network device determines that the inter-system unnecessary handover of the terminal device occurs.

It should be understood that the quality threshold in the embodiments of this application may be understood as a threshold for determining that the inter-system unnecessary handover of the terminal device occurs.

The first network device determines, based on the measurement result of the first network device, whether the inter-system unnecessary handover of the terminal device occurs. The first network device learns of all measurement results of the measurement performed by the terminal device, and this not only enables the first network device to determine whether the inter-system unnecessary handover of the terminal device occurs, but also helps the first network device perform more flexible and accurate adjustment after it is determined that the inter-system unnecessary handover of the terminal device occurs.

With reference to the first aspect, in a possible implementation, the first message further includes: at least measurement duration for performing measurement on the first network device by the terminal device or a quality threshold for allowing the second network device to send the measurement result information of the first network device to the first network device.

It should be understood that the "quality threshold for allowing the second network device to send the measurement result information of the first network device to the first network device" in the embodiments of this application may be understood as the threshold for determining that the inter-system unnecessary handover of the terminal device occurs.

With reference to the first aspect, in a possible implementation, the first message further includes the measurement duration for performing measurement on the first network device by the terminal device, the second message includes the measurement result information of the first network device, and that the first network device determines, based on the second message, whether the inter-system unnecessary handover of the terminal device occurs includes: The first network device determines whether the measurement result in the measurement result information of the first network device is not less than a quality threshold within the measurement duration; and when the measurement result is greater than or equal to the quality threshold within the measurement duration, the first network device determines that the inter-system unnecessary handover of the terminal device occurs.

With reference to the first aspect, in a possible implementation, the first message is a handover request message.

With reference to the first aspect, in a possible implementation, the measurement object information includes at least one of the following parameters: a physical cell identifier PCI corresponding to the SSB of the first network device, a frequency of the SSB of the first network device, a new radio cell global identifier NCGI corresponding to the SSB of the first network device, or a channel state information-reference signal CSI-RS of the first network device.

According to a second aspect, a wireless network communication method is provided, and includes: A second network device receives a first message sent by a first network device, where the first message includes measurement object information of the first network device; the second network device receives measurement result information of the first network device sent by a terminal device; and the second network device sends a second message to the first network device, where the second message includes indication information or measurement result information that is of the first network device, and the indication information is used to indicate whether an inter-system unnecessary handover of the terminal device occurs.

In the technical solution of this application, according to the provided wireless communication method, after the terminal device is handed over to the second network device, the terminal device continues performing measurement on the first network device, so that a network can determine whether the inter-system unnecessary handover of the terminal device occurs. When the network determines that a system handover of the terminal device occurs, the inter-system unnecessary handover can be further reduced.

With reference to the second aspect, in a possible implementation, when the inter-system unnecessary handover of the terminal device occurs, the method further includes: the second network device negotiates with the first network device about changing a second network device handover threshold.

With reference to the second aspect, in a possible implementation, that the second network device negotiates with the first network device about changing a second network device handover threshold includes: The second network device receives a third message sent by the first network device, where the third message is used to indicate a second network device handover threshold recommended by the first network device; and the second network device sends a fourth message to the first network device, where the fourth message is used to indicate whether the second network device accepts the second network device handover threshold recommended by the first network device.

With reference to the second aspect, in a possible implementation, the third message includes any one of the following information:
the second network device handover threshold recommended by the first network device; a bias value of a specific cell or a specific synchronization signal and physical broadcast channel block SSB relative to an original second network device handover threshold; or an offset value of the second network device handover threshold recommended by the first network device relative to an original second network device handover threshold.

It should be understood that the information included in the third message may be used to increase the original second network device handover threshold, to reduce a probability of the inter-system handover of the terminal device.

With reference to the second aspect, in a possible implementation, when the fourth message indicates that the second network device does not accept the second network device handover threshold recommended by the first network device, the fourth message includes a handover threshold change range allowed by the second network device.

When the inter-system unnecessary handover of the terminal device occurs, the first network device negotiates with the second network about changing the second network device handover threshold, so that the inter-system unnecessary handover can be reduced, thereby improving user experience and resource utilization.

With reference to the second aspect, in a possible implementation, before that the second network device receives measurement result information of the first network device sent by a terminal device, the method further includes: The second network device sends, to the terminal device, the measurement object information of the first network device or measurement duration for performing measurement on the first network device by the terminal device.

With reference to the second aspect, in a possible implementation, before that the second network device sends a second message to the first network device, the method further includes: The second network device determines whether a measurement result in the measurement result information of the first network device is not less than a quality threshold; and when the measurement result is greater than or equal to the quality threshold, determines that the inter-system unnecessary handover of the terminal device occurs.

With reference to the second aspect, in a possible implementation, before that the second network device sends a second message to the first network device, the method further includes: The second network device determines whether the measurement result in the measurement result information of the first network device is not less than a quality threshold within the measurement duration for performing measurement on the first network device by the terminal device; and when the measurement result is greater than or equal to the quality threshold within the measurement duration, determines that the inter-system unnecessary handover of the terminal device occurs.

The second network device determines, based on the measurement result of the first network device, whether the inter-system unnecessary handover of the terminal device occurs, and may notify the first network device of a determining result. Because the second network device may notify the first network device only when the inter-system unnecessary handover of the terminal device occurs, signaling overheads can be reduced.

With reference to the second aspect, in a possible implementation, the first message further includes: at least measurement duration for performing measurement on the first network device by the terminal device or a quality threshold for allowing the second network device to send the measurement result information of the first network device to the first network device.

With reference to the second aspect, in a possible implementation, the first message is a handover request message.

With reference to the second aspect, in a possible implementation, the measurement object information includes at least one of the following parameters: a physical cell identifier PCI corresponding to the SSB of the first network device, a frequency of the SSB of the first network device, a new radio cell global identifier NCGI corresponding to the SSB of the first network device, or a channel state information-reference signal CSI-RS of the first network device.

According to a third aspect, a wireless network communication method is provided, and includes: A terminal device receives measurement object information of a first network device; and the terminal device sends measurement result information of the first network device to a second network device.

With reference to the third aspect, in a possible implementation, before that the terminal device sends measurement result information of the first network device to a second network device, the method further includes: The terminal device performs measurement on the first network device based on the measurement object information of the first network device.

With reference to the third aspect, in a possible implementation, that a terminal device receives measurement object information of a first network device includes: The terminal device receives the measurement object information of the first network device sent by the second network device.

With reference to the third aspect, in a possible implementation, the method further includes: The terminal device receives measurement duration for performing measurement on the first network device.

After the terminal device is handed over to the second network device, the terminal device continues performing measurement on the first network device, and a measurement result obtained through the measurement may be used by a network to determine whether an inter-system unnecessary handover of the terminal device occurs.

According to a fourth aspect, a network device is provided, and includes a module configured to perform a method, a operation, an operation, or a function performed by the first network device in the foregoing.

According to a fifth aspect, a network device is provided, and includes a module configured to perform a method, a operation, an operation, or a function performed by the second network device in the foregoing.

According to a sixth aspect, a terminal device is provided, and includes a module configured to perform a method, a operation, an operation, or a function performed by the terminal device in the foregoing.

According to a seventh aspect, a communication apparatus is provided, where the communication apparatus includes at least one processor and a communication interface. The communication interface is used by the communication apparatus to exchange information with another communication apparatus; and when program instructions are executed in the at least one processor, the communication apparatus is enabled to implement a function of the first network device in the foregoing.

According to an eighth aspect, a communication apparatus is provided, where the communication apparatus includes at least one processor and a communication interface. The communication interface is used by the communication apparatus to exchange information with another communication apparatus; and when program instructions are executed in the at least one processor, the communication apparatus is enabled to implement a function of the second network device in the foregoing.

According to a ninth aspect, a communication apparatus is provided, where the communication apparatus includes at least one processor and a communication interface. The communication interface is used by the communication apparatus to exchange information with another communication apparatus; and when program instructions are executed in the at least one processor, the communication apparatus is enabled to implement a function of the terminal device in the foregoing.

According to a tenth aspect, a computer program storage medium is provided. The computer program storage medium has program instructions; and when the program instructions are directly or indirectly executed, a function of the first network device in the foregoing is implemented.

According to an eleventh aspect, a computer program storage medium is provided. The computer program storage medium has program instructions; and when the program instructions are directly or indirectly executed, a function of the second network device in the foregoing is implemented.

According to a twelfth aspect, a computer program storage medium is provided. The computer program storage medium has program instructions; and when the program instructions are directly or indirectly executed, a function of the terminal device in the foregoing is implemented.

According to a thirteenth aspect, a chip system is provided, where the chip system includes at least one processor; and when program instructions are executed in the at least one processor, a function of the first network device in the foregoing is implemented.

According to a fourteenth aspect, a chip system is provided, where the chip system includes at least one processor; and when program instructions are executed in the at least one processor, a function of the second network device in the foregoing is implemented.

According to a fifteenth aspect, a chip system is provided, where the chip system includes at least one processor; and when program instructions are executed in the at least one processor, a function of the terminal device in the foregoing is implemented.

According to a sixteenth aspect, a computer program product is provided, and includes program instructions; and when the program instructions are directly or indirectly executed, a function of the first network device in the foregoing is implemented.

According to a seventeenth aspect, a computer program product is provided, and includes program instructions; and when the program instructions are directly or indirectly executed, a function of the second network device in the foregoing is implemented.

According to an eighteenth aspect, a computer program product is provided, and includes program instructions; and when the program instructions are directly or indirectly executed, a function of the terminal device in the foregoing is implemented.

According to a nineteenth aspect, a communication system is provided, and includes the first network device, the second network device, and the terminal device in the foregoing.

DESCRIPTION OF EMBODIMENTS

The following describes technical solutions in embodiments of this application with reference to accompanying drawings.

Figure 1:
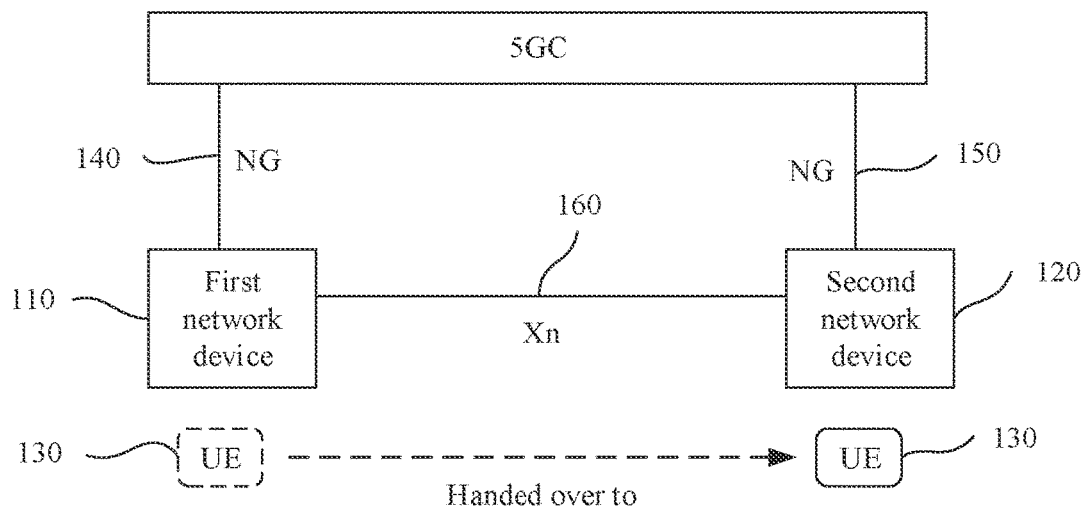
FIG. 1 is a schematic architectural diagram of an application scenario according to an embodiment of this application.

FIG. 1 is a schematic architectural diagram of an application scenario according to an embodiment of this application. As shown in FIG. 1, the application scenario may include a first network device 110, a second network device 120, and a terminal device 130.

The first network device 110 and the second network device 120 may be devices configured to communicate with the terminal device 130. For example, the first network device 110 and the second network device 120 may be base stations configured to enable the terminal device 130 to access a radio access network (RAN). The base station may also be sometimes referred to as an access network device or an access network node. It may be understood that, in systems using different radio access technologies, names of devices having base station functions may be different. For ease of understanding, in this embodiment of this application, an example in which the first network device 110 and the second network device 120 are base stations is used for description. In addition, for ease of description, apparatuses that provide a wireless communication access function for a terminal are collectively referred to as a base station in the embodiments of this application.

In this embodiment of this application, the first network device 110 and the second network device 120 support different radio access technologies. The first network device 110 may be, for example, a next generation node base station (gNB) in a new radio (NR) system, and the second network device 120 may be a next generation evolved NodeB (ng-eNB) in an evolved universal terrestrial radio access (E-UTRA) system. Both the first network device 110 and the second network device 120 may access a 5G core (5GC). There may be one cell or a plurality of cells within coverage of one first network device 110 or one second network device 120.

The terminal device 130 may communicate with one or more core networks (CN) through a network device such as a base station. The terminal device may also be referred to as user equipment (UE), an access terminal, a terminal, a subscriber unit, a subscriber station, a mobile station, a mobile console, a remote station, a remote terminal, a mobile device, a user terminal, a wireless network device, a user agent, or a user apparatus. The terminal may be a cellular phone, a cordless phone, a session initiation protocol (SIP) phone, a smartphone, a wireless local loop (WLL) station, a personal digital assistant (PDA), a handheld device or computing device having a wireless communication function, another device connected to a wireless modem, a vehicle-mounted device, a wearable device, an unmanned aerial vehicle device, a terminal in the internet of things or the internet of vehicles, a terminal in any form in a future network, relay user equipment, a terminal in a future evolved public land mobile network (PLMN), or the like. This is not limited in the embodiments of this application. For ease of description, in the embodiments of this application, the terminal devices that access a network are collectively referred to as a terminal or a terminal device. In some embodiments, the terminal or the terminal device may alternatively be identified by using UE.

In this embodiment of this application, the terminal device 130 may access the 5G core through the first network device 110, or may access the 5G core through the second network device 120. The terminal device 130 may be handed over from the first network device 110 to the second network device 120, or may be handed over from the second network device 120 to the first network device 110. Certainly, the terminal device 130 may be handed over from the first network device 110 to another network device that supports a same radio access technology as the first network device 110, or may be handed over from the second network device 120 to another network device that supports a same radio access technology as the second network device 120. For ease of understanding, an example in which the terminal device 130 is handed over from the first network device 110 to the second network device 120 is used for description in this embodiment of this application.

In addition, an interface 140 between the first network device 110 and the 5G core may be referred to as a next generation (NG) interface, or may be referred to as an N2 interface. An interface 150 between the second network device 120 and the 5G core may be referred to as a next generation (NG) interface, or may be referred to as an N2 interface. An interface 160 between the first network device 110 and the second network device 120 may be referred to as an Xn interface.

It should be noted that in FIG. 1, only an example in which the terminal device 130 is UE is used for description. Names of interfaces between network devices in FIG. 1 are merely examples. In specific implementation, the names of the interfaces in the system architecture may be other names. This is not specifically limited in this embodiment of this application.

For ease of understanding, in this embodiment of this application, an example in which the first network device 110 is a gNB, the second network device 120 is an ng-eNB, and the terminal device 130 is UE is used for description. The gNB may provide the terminal device 130 with a user plane and a control plane of NR, and the ng-eNB may provide the terminal device 130 with a user plane and a control plane of E-UTRA. NR can provide the terminal device 130 with better user experience than E-UTRA. For example, NR can provide the terminal device 130 with a downlink peak rate of 20 Gbps, an uplink peak rate of 10 Gbps, and a control plane latency of 10 ms. E-UTRA can provide the terminal device with a downlink peak rate of 1 Gbps, an uplink peak rate of 500 Mbps, a control plane latency of 50 ms, and the like.

Due to a handover setting, in some cases, the UE is handed over from NR to E-UTRA even if NR coverage quality is sufficient to provide the UE with a good service. This type of handover may be referred to as an inter-system unnecessary handover. For example, if a serving threshold of the gNB that supports NR is set to an excessively high value, when the UE detects that the ng-eNB that supports E-UTRA has good signal strength, the UE is handed over from the gNB to the ng-eNB. The inter-system unnecessary handover affects user experience and may cause non-optimal network resource usage. Therefore, the inter-system unnecessary handover needs to be reduced.

Currently, a handover of the UE from the gNB to the ng-eNB is usually determined by the network. The network provides the UE with a list of neighbor E-UTRA cells and measurement control information, and based on the measurement control information, the UE may perform measurement on a neighbor E-UTRA cell and report a measurement result. Based on the measurement result reported by the UE, the network determines whether to initiate a handover to the ng-eNB. When making a handover decision, the network usually considers the measurement result reported by the UE, and may also consider neighbor E-UTRA cell load, traffic distribution, transport and hardware resources, an operation policy, and the like.

In other words, the network may determine whether to initiate a handover of the UE from the gNB to the ng-eNB, but cannot determine whether this type of handover is an inter-system unnecessary handover. Consequently, the inter-system unnecessary handover cannot be reduced.

Therefore, how the network determines whether the inter-system unnecessary handover of the terminal device occurs is a problem that needs to be resolved. The following describes in detail this embodiment of this application with reference to FIG. 2.

Figure 2:
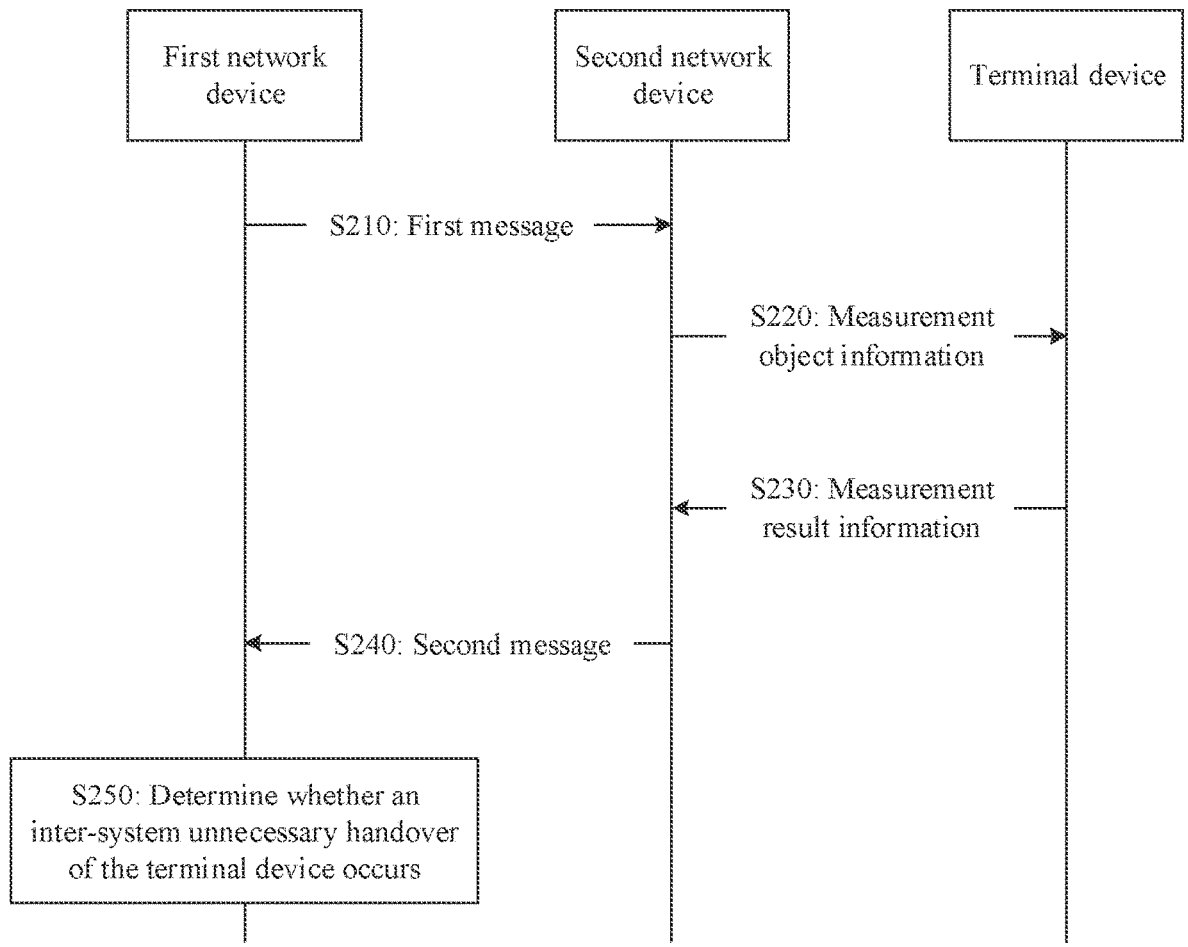
FIG. 2 is a schematic flowchart of a wireless network communication method according to an embodiment of this application.

FIG. 2 is a schematic flowchart of a wireless network communication method according to an embodiment of this application. The method in FIG. 2 may be used in the foregoing application scenario and communication systems. The method may include operation S210 to operation S250. The following describes the operations in detail with reference to FIG. 2.

In S210, a first network device sends a first message to a second network device, where the first message includes measurement object information of the first network device.

The first network device may be the first network device 110 in FIG. 1, the second network device may be the second network device 120 in FIG. 1, and the first network device and the second network device support different radio access technologies. Both the first network device and the second network device may be base stations. In some embodiments, the first network device may be referred to as a source base station, and the second network device may be referred to as a target base station.

The measurement object information of the first network device describes a specific object of measurement that continues being performed on the first network device by a terminal device. The measurement object information of the first network device may include any one or more of parameters such as a physical cell identifier (PCI) corresponding to a synchronization signal and physical broadcast channel block (SSB) of the first network device, a frequency of an SSB of the first network device, a new radio cell global identifier (NCGI) corresponding to an SSB of the first network device, or a channel state information-reference signal (CSI-RS) of the first network device.

The SSB in the embodiments of this application includes a primary synchronization signal (PSS), a secondary synchronization signal (SSS), and a physical broadcast channel (PBCH). The SSB occupies four symbols in time domain and 240 subcarriers in frequency domain. The terminal device may obtain a physical layer cell identifier (identifier, ID) and slot synchronization by using the PSS. The terminal device may obtain a cyclic prefix (CP) length, a physical cell group ID, and frame synchronization by using the SSS. The terminal device can obtain a master information block (MIB) by decoding the PBCH, including configuration information of a quantity of common antenna ports, configuration information of a system frame number (SFN), configuration information of a downlink system bandwidth, and configuration information of physical hybrid automatic repeat request indicator information (PHICH).

Specifically, when an SSB is associated with remaining minimum system information (RMSI), the SSB corresponds to an independent cell, and the cell has a unique NR cell global identifier (NCGI). In this case, this type of SSB is referred to as a cell-defining SSB (CD-SSB). Only the CD-SSB can be used to send a master information block (MIB) message and a system information block 1 (SIB1) message, and when performing cell selection, UE performs access based only on a synchronization signal of the CD-SSB. Another SSB can be used to send only a MIB message and cannot be used to send a SIB1 message.

Each SSB corresponds to one PCI, and PCIs corresponding to a plurality of SSBs may be the same or may be different. When each SSB corresponds to one unique PCI, the PCI may indicate a unique SSB. When a plurality of SSBs correspond to a same PCI, a frequency and a PCI of the SSB may indicate a unique SSB. The frequency of the SSB may be a radio frequency reference frequency of the SSB, or an NR absolute radio frequency channel number of the SSB or an operating frequency band of a carrier on which the SSB is located.

When the SSB is described above, a concept of CD-SSB is proposed. It is learned that a CD-SSB corresponds to a single cell, and the cell has a unique NCGI. Because each CD-SSB has a corresponding NCGI, when an NCGI of an SSB is indicated, the SSB may be determined.

Optionally, the first message may further include measurement duration for performing measurement on the first network device by the terminal device. The terminal device continuously performs measurement on the first network device within the time duration. Specifically, the terminal device may perform measurement on a specific measurement object in the measurement object information of the first network device.

Optionally, the first message may further include a quality threshold for allowing the second network device to report measurement result information of performing measurement on the first network device by the terminal device. The quality threshold may be understood as a minimum threshold for allowing the second network device to report a measurement result of the first network device to the first network device. For example, the second network device reports a measurement result to the first network device only when the measurement result, of the measurement object of the first network device, measured by the terminal device is greater than or equal to the quality threshold. For another example, the second network device reports a measurement result to the first network device only when all measurement results, of the measurement object of the first network device, measured by the terminal device are greater than or equal to the quality threshold within measurement duration. The quality threshold may be represented by reference signal received power (RSRP), a signal-to-interference-plus-noise ratio (SINR), or reference signal received quality (RSRQ).

The measurement result information of the first network device may include one or more of RSRP, an SINR, or RSRQ of the measurement object. It may be learned that the measurement result in the measurement result information and the quality threshold may be compared with each other only when the measurement result and the quality threshold have a consistent representation form or have a correspondence between each other.

It should be understood that the quality threshold in the embodiments of this application may also be understood as a threshold for determining that an inter-system unnecessary handover of the terminal device occurs.

Optionally, the first message may be a handover request message.

In operation S220, the second network device sends the measurement object information of the first network device to the terminal device.

The measurement object information of the first network device sent by the second network device to the terminal device is consistent with the description that the second network device receives the measurement object information sent by the first network device in operation S210. For details, refer to the foregoing descriptions.

The second network device may directly or indirectly send the measurement object information of the first network device to the terminal device.

In an example, the second network device may directly send the measurement object information of the first network device to the terminal device after the terminal device is handed over from the first network device to the second network device.

In another example, the second network device may send the measurement object information of the first network device to the first network device, and the first network device forwards the measurement object information of the first network device to the terminal device. In this case, the terminal device is in a process of being handed over from the first network device to the second network device.

For example, the second network device may send a sixth message to the first network device, and the sixth message includes measurement object information of the first network device. The first network device sends a seventh message to the terminal device, and the seventh message includes measurement object information of the first network device. The measurement object information included in the sixth message may be consistent with that included in the seventh message. In other words, the first network device forwards, to the terminal device, the measurement object information in the sixth message sent by the second network device.

Optionally, in operation S220, the second network device may further send, to the terminal device, the measurement duration for performing measurement on the first network device by the terminal device. Within the duration, the terminal device continuously performs measurement on the first network device.

Optionally, the sixth message may further include the measurement duration for performing measurement on the first network device by the terminal device.

Optionally, the seventh message may further include the measurement duration for performing measurement on the first network device by the terminal device.

Optionally, the sixth message may be a handover request acknowledgement message, and the seventh message may be a radio resource control (RRC) reconfiguration message.

It should be understood that the measurement duration included in the sixth message is consistent with that included in the seventh message. In other words, the first network device forwards, to the terminal device, the measurement duration in the sixth message sent by the second network device.

In operation S230, the terminal device sends the measurement result information of the first network device to the second network device.

The measurement result information of the first network device includes the measurement result of the terminal device for the first network device, for example, includes the measurement result of the terminal device for the measurement object of the first network device. The measurement result information may include one or more of the RSRP, the SINR, or the RSRQ of the measurement object.

For example, the measurement result information may include RSRP, RSRQ, an SINR, or the like of the SSB of the first network device, or RSRP, RSRQ, an SINR, or the like of the CSI-RS of the first network device.

Optionally, before operation S230, the terminal device may further send a handover complete message, for example, an RRC reconfiguration complete message, to the second network device, to indicate that the terminal device has been handed over from the first network device to the second network device.

A process in which the second network device directly sends the measurement object information of the first network device to the terminal device in operation S220 may be performed after the terminal device sends the handover complete message.

Before operation S230, the terminal device may perform measurement on the first network device based on the measurement object information of the first network device or the measurement duration for performing measurement on the first network device by the terminal device that are/or is received in operation S220.

In operation S240, the second network device sends a second message to the first network device, where the second message includes indication information or measurement result information that is of the first network device, and the indication information is used to indicate whether an inter-system unnecessary handover of the terminal device occurs.

In an example, the second message may include indication information, and the indication information is used to indicate whether the inter-system unnecessary handover of the terminal device occurs. In other words, before the second network device sends the second message to the first network device, the second network device determines whether the inter-system unnecessary handover of the terminal device occurs.

For example, after receiving the measurement result information of the first network device sent by the terminal device, the second network device determines, based on the measurement result information, whether the inter-system unnecessary handover of the terminal device occurs.

For example, the second network device may determine a value relationship between the measurement result of the first network device and the quality threshold. If the measurement result of the first network device is less than the quality threshold, the second network device determines that the inter-system unnecessary handover of the terminal device does not occur. If the measurement result of the first network device is greater than or equal to the quality threshold, the second network device determines that the inter-system unnecessary handover of the terminal device occurs. The second network device may send a second message including indication information to the first network device, where the indication information indicates that the inter-system unnecessary handover of the terminal device occurs.

For example, the second network device may determine a value relationship between the measurement result of the first network device within the measurement duration and the quality threshold. If all measurement results of the first network device within the measurement duration are greater than or equal to the quality threshold, the second network device determines that the inter-system unnecessary handover of the terminal device occurs. The second network device may send a second message including indication information to the first network device, where the indication information indicates that the inter-system unnecessary handover of the terminal device occurs.

Optionally, when sending the indication information, the second network device may further send the measurement result information of the first network device to the first network device. Herein, the measurement result in the measurement result information of the first network device sent by the second network device is greater than or equal to the quality threshold.

For example, the measurement result information may include a list of SSBs of the first network device, and radio quality of all the SSBs in the list is greater than or equal to a quality threshold within the measurement duration.

For another example, the measurement result information may include a list of CSI-RSs of the first network device, and radio quality of all the CSI-RSs in the list is greater than or equal to a quality threshold within the measurement duration.

It should be understood that the quality threshold herein may also be understood as a minimum threshold for allowing the second network device to report the indication information or the measurement result information that is of the first network device to the first network device.

Optionally, when the second network device determines that the inter-system unnecessary handover of the terminal device does not occur, the second network device may send indication information to the first network device, where the indication information indicates that the inter-system unnecessary handover of the terminal device does not occur, and the indication information may not be sent.

In another example, the second message may include the measurement result information of the first network device. In other words, the second network device sends the measurement result information of the first network device to the first network device, and the first network device determines, based on the measurement result information of the first network device, whether the inter-system unnecessary handover of the terminal device occurs.

For example, the first network device may determine the value relationship between the measurement result of the first network device and the quality threshold. If the measurement result of the first network device is less than the quality threshold, the first network device determines that the inter-system unnecessary handover of the terminal device does not occur. If the measurement result of the first network device is greater than or equal to the quality threshold, the first network device determines that the inter-system unnecessary handover of the terminal device occurs.

It should be understood that the quality threshold herein may be the same as a quality threshold used by the second network device. For both the first network device and the second network device, when the measurement result of the first network device is greater than or equal to the quality threshold, it may be determined that the inter-system unnecessary handover of the terminal device occurs.

Optionally, the quality threshold may be determined by the first network device and then sent to the second network device, or may be preset inside the first network device and the second network device.

In operation S250, the first network device determines whether the inter-system unnecessary handover of the terminal device occurs.

The first network device may directly determine whether the inter-system unnecessary handover of the terminal device occurs, or the second network device may determine whether the inter-system unnecessary handover of the terminal device occurs, and then notifies the first network device of a result of the determining. For detailed content, refer to the description of determining whether the inter-system unnecessary handover of the terminal device occurs in operation S240. Details are not described herein again.

It should be understood that the measurement duration for performing measurement on the first network device by the terminal device may also be referred to as the measurement duration for short. Alternatively, the measurement duration may be predefined or preconfigured. For example, the measurement duration is preconfigured in the second network device, the first network device, or the terminal device. In both operation S210 and operation S220, measurement duration configured by the first network device may be sent, or preconfigured measurement duration determined by the second network device may be sent in operation S220, or the terminal device may use default measurement duration.

According to the wireless network communication method in FIG. 2, the first network device may determine whether the inter-system unnecessary handover of the terminal device occurs, so that when the inter-system unnecessary handover of the terminal device occurs, the first network device can further reduce a probability of the inter-system unnecessary handover of the terminal device.

The method in FIG. 2 shows that the wireless network communication method, enables a network to determine whether the inter-system unnecessary handover of the terminal device occurs. Further, if the inter-system unnecessary handover of the terminal device occurs, the network may further adjust a related parameter of an inter-system handover to reduce the inter-system unnecessary handover of the terminal device.

Figure 3:
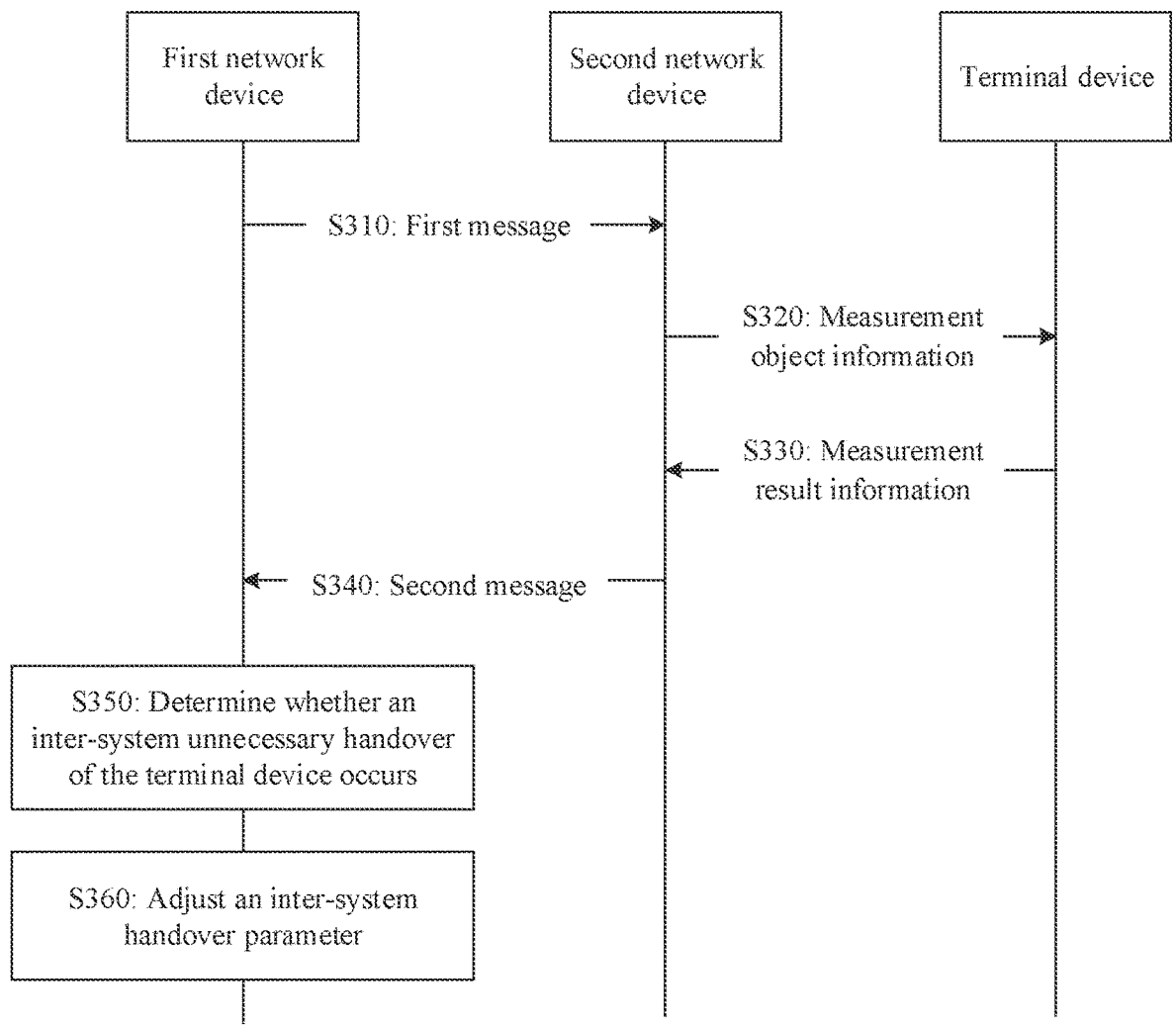
FIG. 3 is a schematic flowchart of a wireless network communication method according to another embodiment of this application.

FIG. 3 is a schematic flowchart of a wireless network communication method according to another embodiment of this application. The method may include operation S310 to operation S360.

Compared with the method shown in FIG. 2, the method shown in FIG. 3 further includes operation S360. Operation S310 to operation S350 are the same as operation S210 to operation S250 in the method shown in FIG. 2. For brevity, details are not described herein again. Only operation S360 is described in detail below.

After a first network device determines that an inter-system unnecessary handover of a terminal device occurs, the first network device may evaluate whether an inter-system handover parameter may be adjusted, and perform corresponding adjustment.

In operation S360, the first network device adjusts the inter-system handover parameter.

The first network device may adjust the inter-system handover parameter in a plurality of manners.

In a possible implementation, the first network device may adjust an inter-system handover parameter of the first network device.

For example, the first network device may adjust a handover policy. For example, a priority of a handover between SSBs of the first network device is increased, and a priority of an inter-system handover is reduced. This is equivalent to that the terminal device is preferentially handed over under the first network device, thereby reducing a probability of the inter-system handover of the terminal device.

For another example, the first network device may alternatively adjust a first network device handover threshold, for example, increase an inter-system handover threshold, to reduce the probability of the inter-system handover.

For still another example, the first network device may alternatively adjust both the handover policy and the first network device handover threshold.

It should be understood that the handover threshold in the embodiments of this application may be a threshold for initiating a handover preparation procedure by a network device.

In another possible implementation, the first network device may negotiate with the second network device about changing a second network device handover threshold.

For example, the first network device may send a third message to the second network device, where the third message is used to indicate a second network device handover threshold recommended by the first network device. The second network device may send a fourth message to the first network device, where the fourth message is used to indicate whether the second network device accepts the second network device handover threshold recommended by the first network device.

It should be understood that the second network device handover threshold recommended by the first network device herein may be understood as a changed second network device handover threshold recommended by the first network device.

The third message may indicate, in a plurality of manners, the second network device handover threshold recommended by the first network device.

In an example, the third message may include the second network device handover threshold recommended by the first network device. It may be understood as that the third message may include an absolute value of the changed second network device handover threshold.

For example, the third message includes the absolute value 4 dB of the changed second network device handover threshold. In this case, when the terminal device detects that radio quality of the second network device is 4 dB greater than radio quality of the first network device, the first network device initiates a handover request to the second network device, to hand over the terminal device from the first network device to the second network device.

In another example, the third message may include a bias value of a specific cell or a specific SSB relative to an original second network device handover threshold. It may be understood as that the second network device handover threshold recommended by the first network device is equal to a sum of the original second network device handover threshold and the bias value.

For example, the original second network device handover threshold is 4 dB, and the bias value of the specific cell such as a cell 1 relative to the original second network device handover threshold is 0.5 dB. In this case, when the terminal device detects that radio quality of the cell 1 of the second network device is 4.5 dB greater than radio quality of the first network device, the first network device initiates a handover request to the second network device, to hand over the terminal device from the first network device to the cell 1 of the second network device.

It should be understood that the specific cell herein may be any cell of the second network device. In this embodiment of this application, the cell 1 is merely used as an example, and does not constitute any limitation on this embodiment of this application.

It should be further understood that a bias value of a specific cell or a specific SSB relative to an original second network device handover threshold of a base station may be positive, or may be negative. In this embodiment of this application, only an example in which the bias value is positive is used for description. In some embodiments, both the bias value being positive or negative and a relationship between the second network device handover threshold recommended by the first network device and the bias value may have other definitions, to adjust the inter-system handover parameter and reduce the probability of the inter-system handover.

In still another example, the third message may include an offset value of the second network device handover threshold recommended by the first network device relative to the original second network device handover threshold. This offset value may be understood as an offset value of the changed second network device handover threshold relative to the original second network device handover threshold.

For example, the third message includes an offset value 0.5 dB of the changed second network device handover threshold relative to the original second network device handover threshold. This is equivalent to that the changed second network device handover threshold is 0.5 dB plus the original second network device handover threshold. For example, if the original second network device handover threshold is 4 dB, the changed second network device handover threshold is 4.5 dB. When the terminal device detects that the radio quality of the second network device is 4.5 dB greater than the radio quality of the first network device, the first network device initiates a handover request to the second network device, to hand over the terminal device from the first network device to the second network device.

It should be noted that, the offset value of the second network device handover threshold recommended by the first network device relative to the original second network device handover threshold may alternatively have another representation form, which is not limited to the offset value 0.5 dB listed above. For example, the third message may include an integer value 2. This is equivalent to that the changed second network device handover threshold is 2*0.5 dB plus the original second network device handover threshold. If the original second network device handover threshold is 4 dB, the changed second network device handover threshold is 5 dB.

The integer value is an integer, and may be specified in decimal, hexadecimal, or octal notation. An optional symbol − or + may be added before the integer value.

It should be noted that a representation form of the offset value of the second network device handover threshold recommended by the first network device relative to the original second network device handover threshold may be positive or negative. In this embodiment of this application, only an example in which the offset value is positive is used for description. In some embodiments, both the offset value being positive or negative and a relationship between the second network device handover threshold recommended by the first network device and the offset value may have other definitions, to adjust the inter-system handover parameter and reduce the probability of the inter-system handover.

There may be two cases in which the second network device sends the fourth message to the first network device.

In one case, the second network device accepts the second network device handover threshold recommended by the first network device. In this case, the fourth message may be a second network device handover threshold change acknowledgement message, and is used to acknowledge that the second network device handover threshold recommended by the first network device is accepted. In addition, the second network device may change the original second network device handover threshold based on the second network device handover threshold recommended by the first network device.

In the other case, if the second network device does not accept the second network device handover threshold recommended by the first network device, the fourth message may be a second network device handover threshold change failure message, and is used to reject the second network device handover threshold recommended by the first network device.

Optionally, when the second network device rejects the second network device handover threshold recommended by the first network device, the fourth message may include a handover threshold change range or specific value allowed by the second network device.

Optionally, when the first network device negotiates with the second network device about changing the second network device handover threshold, the first network device may also adjust the inter-system handover parameter of the first network device. For a specific adjustment manner, refer to the foregoing related descriptions. Details are not described herein again.

In still another possible implementation, the first network device may adjust an inter-system measurement event parameter.

For example, the first network device may send a fifth message to a terminal device that camps on the first network device, where the fifth message is used to indicate an adjusted inter-system measurement event parameter.

The inter-system handover occurs usually because an inter-system measurement event is triggered. Therefore, reducing a quantity of times of triggering an inter-system measurement event can reduce the probability of the inter-system handover.

The inter-system measurement event may include an event B1 and an event B2. The event B1 indicates that B1 triggers an inter-system handover request when signal quality of an inter-system neighbor cell is greater than a threshold. The event B2 indicates that B2 triggers an inter-system handover request when signal quality of a serving cell is less than a threshold and signal quality of an inter-system neighbor is greater than a threshold.

There are a plurality of manners of adjusting the inter-system measurement event parameter.

For example, the first network device may adjust an inter-system measurement event trigger hysteresis parameter. Increasing a value of the event trigger hysteresis parameter can reduce a quantity of times of triggering an inter-system measurement event due to radio signal fluctuation, thereby reducing a ping-pong handover and a decision error. In other words, the first network device may increase a value of a trigger hysteresis parameter of the event B1 or a value of a trigger hysteresis parameter of the event B2.

For another example, the first network device may adjust the inter-system neighbor cell offset amount. The inter-system neighbor cell offset amount may control difficulty of occurrence of an inter-system measurement event. Reducing a value of the inter-system neighbor cell offset amount increases the difficulty of occurrence of an inter-system measurement event. In other words, the first network device may reduce a system neighbor cell offset amount of the event B1 or an inter-system neighbor cell offset amount of the event B2.

For still another example, the first network device may adjust an inter-system measurement event threshold. The inter-system measurement event threshold may be understood as a minimum threshold for triggering an inter-system measurement event. Increasing a value of the inter-system measurement event threshold can reduce the quantity of times of triggering an inter-system measurement event. In other words, the first network device may increase the inter-system measurement event threshold.

Optionally, the first network device may adjust any one or more of the inter-system measurement event trigger hysteresis parameter, the inter-system neighbor cell offset amount, or the inter-system measurement event threshold.

Optionally, when adjusting the inter-system measurement event parameter, the first network device may further negotiate with the second network device about changing the second network device handover threshold or adjust the inter-system handover parameter of the first network device. For a specific adjustment manner, refer to the foregoing related descriptions. Details are not described herein again.

When a network device makes a handover decision, if a handover-related parameter is set improperly, an inter-system unnecessary handover is likely caused. When the first network device determines that the inter-system unnecessary handover of the terminal device occurs, the first network device may adjust the inter-system handover parameter of the first network device, and negotiate with the second network device about changing the second network device handover threshold or changing the inter-system measurement event parameter, so that a probability of an inter-system unnecessary handover of a terminal device that is not handed over and that is served by the first network device can be reduced, thereby reducing the inter-system unnecessary handover, and improving user experience and network resource utilization.

Figure 4:
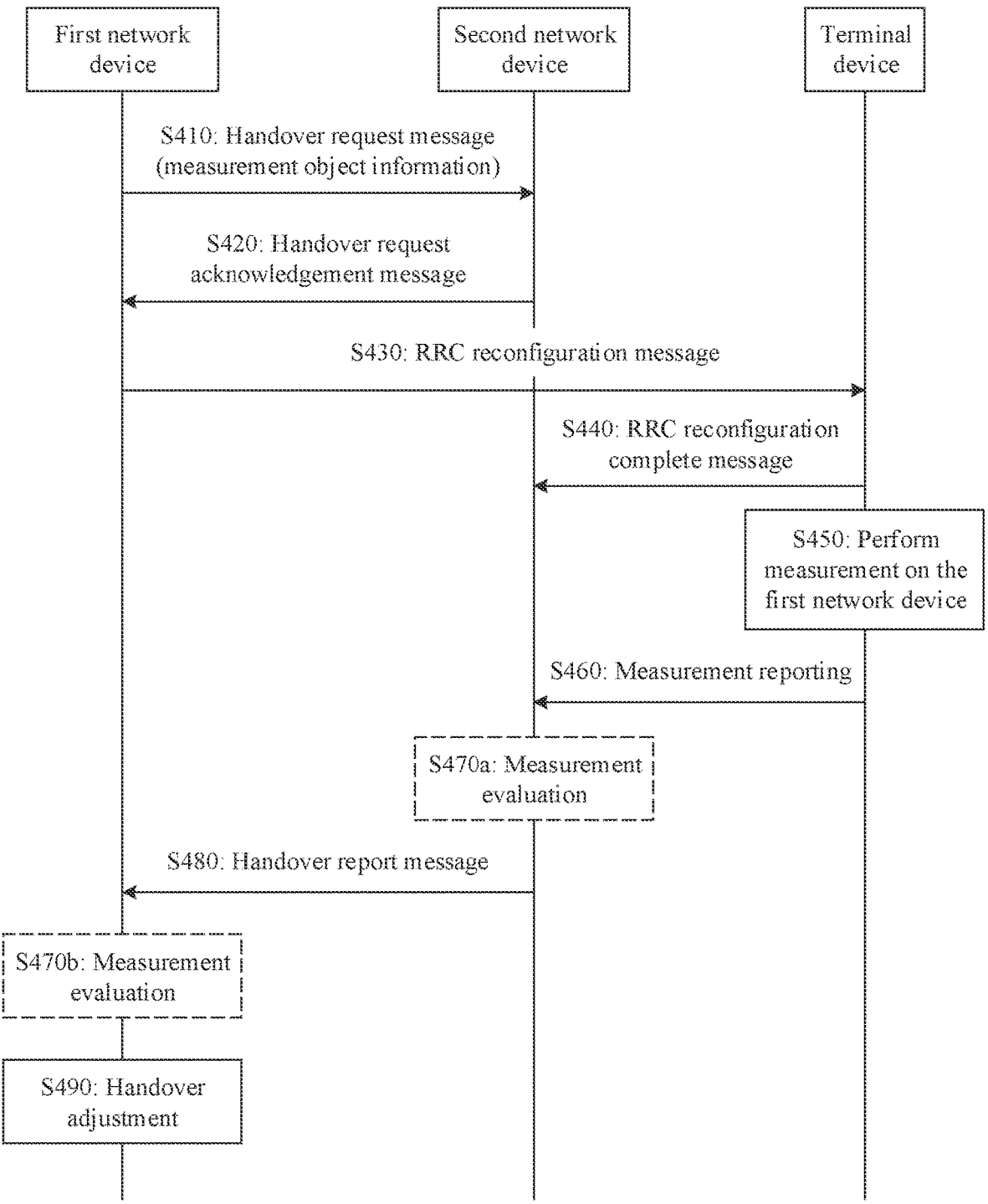
FIG. 4 is a schematic flowchart of a wireless network communication method according to still another embodiment of this application.
Figure 5:
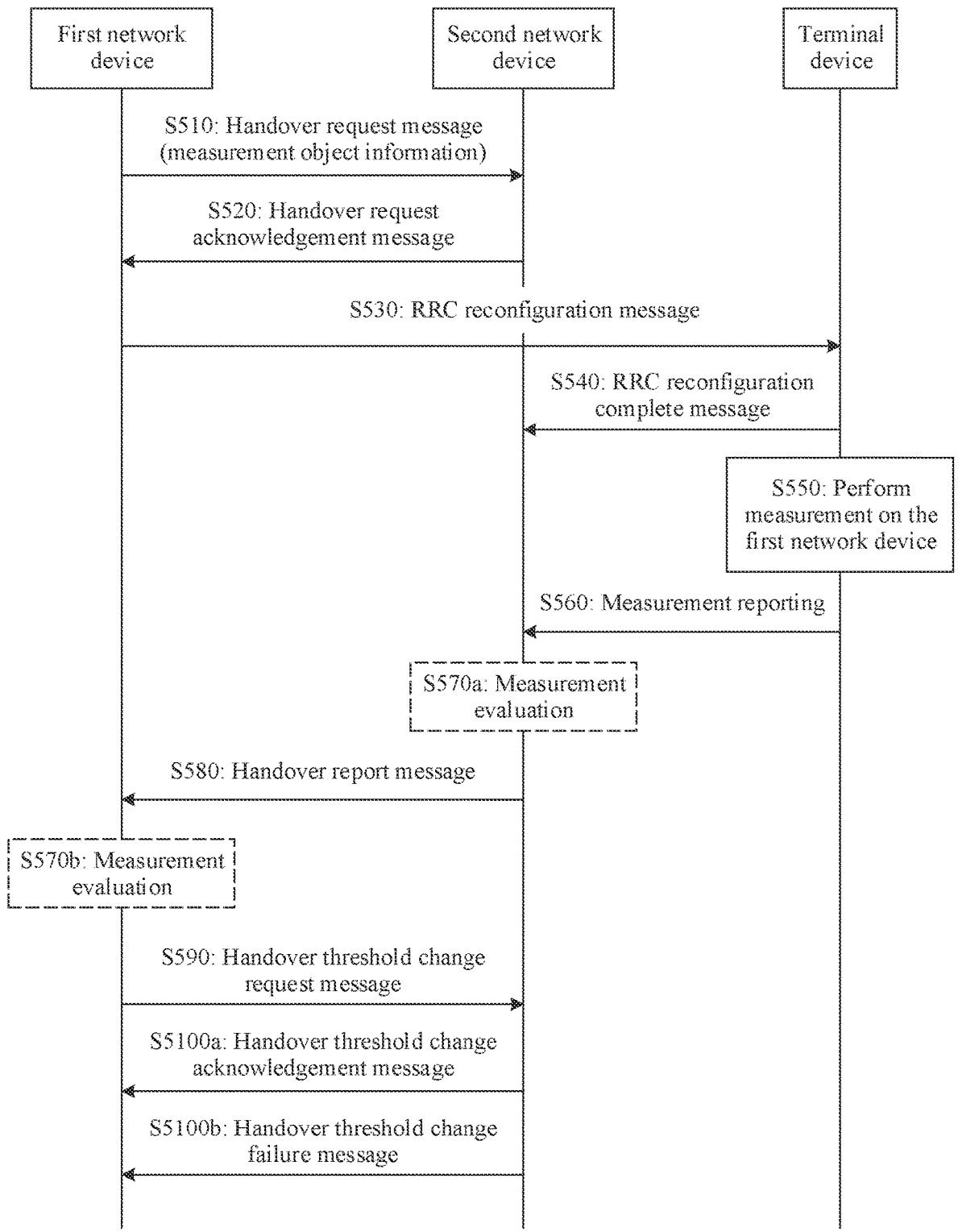
FIG. 5 is a schematic flowchart of a wireless network communication method according to still another embodiment of this application.
Figure 6:
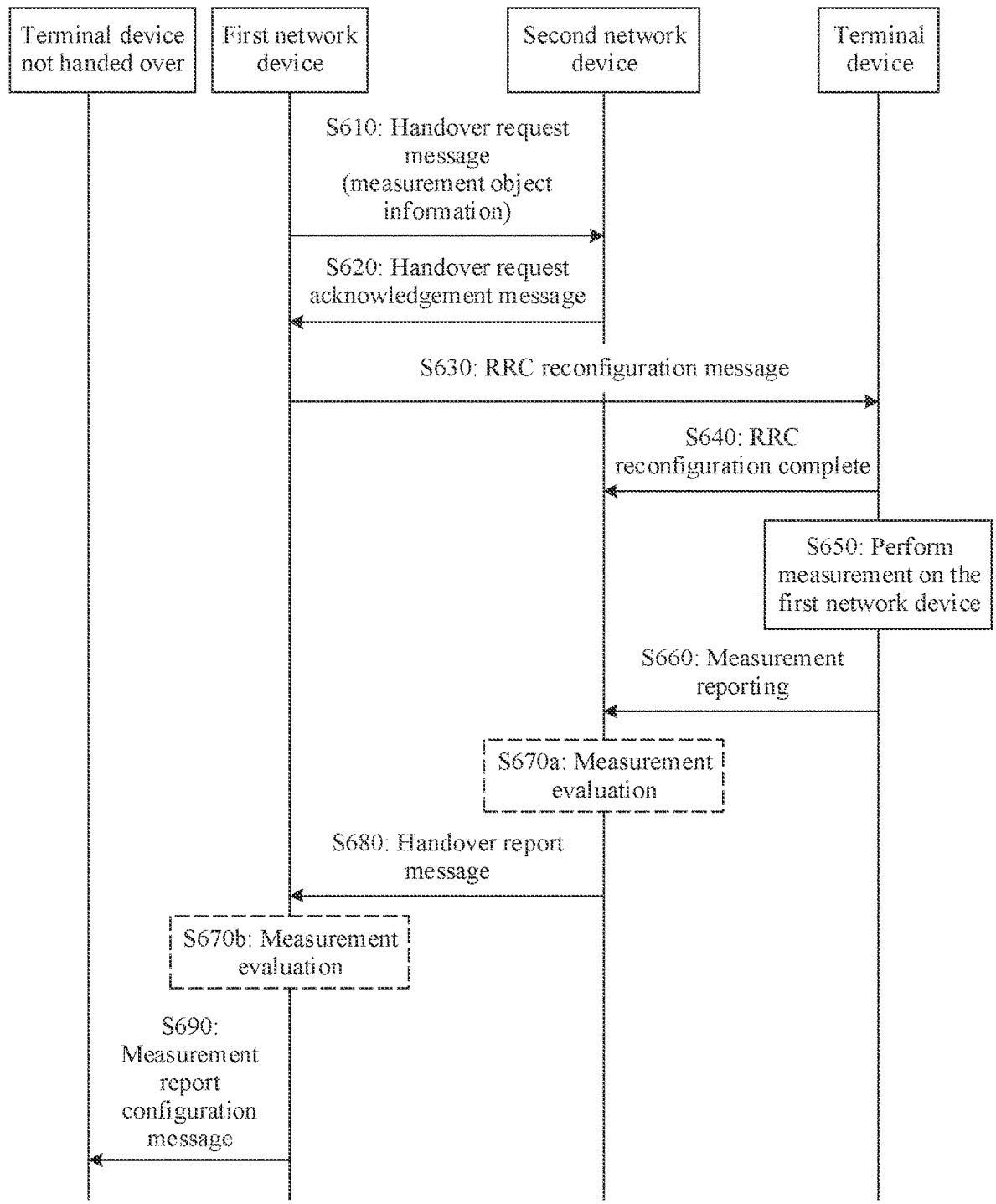
FIG. 6 is a schematic flowchart of a wireless network communication method according to still another embodiment of this application.

The following describes some specific non-limitative examples in the embodiments of this application in more detail with reference to FIG. 4 to FIG. 6.

FIG. 4 is a schematic flowchart of a wireless network communication method according to still another embodiment of this application. The method may include operation S410 to operation S490. The following describes each operation in detail with reference to the specific embodiment.

In operation S410, a first network device sends a handover request message to a second network device, where the handover request message includes measurement object information of the first network device.

It should be understood that the handover request message described herein may be corresponding to the first message in the method in FIG. 2. In this embodiment of this application, for ease of understanding, an example in which the first message is the handover request message is used for description.

The handover request message is used to request the second network device to prepare a related resource used for a terminal device to be handed over, for example, a protocol data unit (PDU) session that required by the terminal device to be handed over to the second network device.

The measurement object information of the first network device may be understood as indicating a specific object of measurement that continues being performed on the first network device by the terminal device. For example, the measurement object information of the first network device includes any one or more of parameters such as a physical cell identifier PCI corresponding to an SSB of the first network device, a frequency of an SSB of the first network device, and an NR cell global identifier NCGI corresponding to an SSB of the first network device. The measurement object information of the first network device further includes a reference signal (RS), for example, a channel state information-reference signal (CSI-RS). The measurement object information of the first network device may alternatively be other information used for network device measurement.

The handover request message may further include measurement duration for performing measurement on the first network device by the terminal device. The measurement duration may be used to indicate duration for performing measurement on the first network device by the terminal device. In other words, within the measurement duration, the terminal device needs to continuously perform measurement on the first network device. Specifically, the terminal device may perform measurement on a specific measurement object in the measurement object information of the first network device, for example, the PCI corresponding to the SSB of the first network device, the frequency of the SSB of the first network device, the NCGI corresponding to the SSB of the first network device, or the CSI-RS of the first network device.

The handover request message may further include a quality threshold for allowing the second network device to report, to the first network device, measurement result information for the measurement performed on the first network device by the terminal device. This quality threshold may be understood as a minimum threshold for allowing the second network device to report a measurement result of the first network device to the first network device, or may be understood as a threshold for determining whether an inter-system handover of the terminal device occurs. For example, when the second network device performs measurement evaluation on the measurement result of the first network device, the second network device reports the measurement result to the first network device only when the measurement result, of the measurement object of the first network device, measured by the terminal device is greater than or equal to the quality threshold.

Optionally, the quality threshold may be represented by reference signal received power RSRP, reference signal received quality RSRQ, or a signal-to-interference-plus-noise ratio SINR. The quality threshold may be any one of or a combination of a plurality of the foregoing listed parameters.

The measurement result information of the first network device may include one or more of RSRP, an SINR, or RSRQ of the measurement object. It may be learned that the measurement result in the measurement result information and the quality threshold may be compared with each other only when the measurement result and the quality threshold may have a consistent representation form or have a correspondence between each other.

The foregoing information included in the handover request message may be understood as related information used by the first network device to request the second network device to indicate the terminal device to continue performing measurement on the first network device. In some other embodiments, it may also be understood as that the first network device sends the foregoing information to the second network device, and then the second network device may determine, based on the foregoing information, that the terminal device continues performing measurement on the first network device.

In operation S420, the second network device sends a handover request acknowledgement message to the first network device, where the handover request acknowledgement message includes the measurement object information in operation S410.

The handover request acknowledgement message described herein may be corresponding to the sixth message in the method in FIG. 2. In this embodiment of this application, for ease of understanding, an example in which the sixth message is the handover request acknowledgement message is used for description.

The handover request acknowledgement message is used to notify the first network device of a preparation status of a handover-related resource that is requested.

The handover request acknowledgement message may include a handover command sent by the second network device to the terminal device, and the handover command may include the measurement object information in operation S410 and operation S420.

Optionally, the handover request acknowledgement message or the handover command may further include the measurement duration for performing measurement on the first network device by the terminal device. The measurement duration may be the measurement duration described in operation S410.

In operation S430, the first network device sends an RRC reconfiguration message to the terminal device, where the RRC reconfiguration message includes the measurement object information of the first network device in operation S410 and operation S420.

The RRC reconfiguration message described herein may be corresponding to the seventh message in the method in FIG. 2. In this embodiment of this application, for ease of understanding, an example in which the seventh message is the RRC reconfiguration message is used for description.

Optionally, the RRC reconfiguration message may further include the measurement duration for performing measurement on the first network device by the terminal device. The measurement duration may be the measurement duration described in operation S410 or operation S420.

In operation S440, after the terminal device successfully completes RRC reconfiguration, the terminal device sends an RRC reconfiguration complete message to the second network device.

After operation S440, the terminal device has been handed over from the first network device to the second network device.

Operation S450: The terminal device performs measurement on the first network device based on the measurement object information or the measurement duration in the RRC reconfiguration message.

It should be noted that the measurement object information or the measurement duration in the RRC reconfiguration message may be understood as measurement configuration information sent by the second network device to the terminal device. In other words, the second network device forwards, by using the RRC reconfiguration message, the measurement configuration information configured for the terminal by the second network device.

For example, if the RRC reconfiguration message includes only the measurement object information, the terminal device may perform real-time measurement on the first network device, or perform measurement on the first network device within predefined or preconfigured measurement duration.

For example, if the RRC reconfiguration message includes the measurement object information and the measurement duration, the terminal device may perform measurement on the first network device within the measurement duration.

Optionally, the second network device may alternatively send a measurement object or the measurement duration of the first network device to the terminal device after operation S440. In this way, the handover request acknowledgement message sent in operation S420 and the RRC reconfiguration message sent in operation S430 may not include the measurement object or the measurement duration of the first network device.

In operation S460, the terminal device reports the measurement result of the first network device to the second network device.

The measurement result of the first network device sent by the terminal device to the second network device may be understood as a measurement result obtained after the terminal device performs measurement on the measurement object of the first network device. For example, the measurement result may include RSRP, RSRQ, or an SINR of an SSB or a CSI-RS of the first network device. The measurement result reported by the terminal device to the second network device corresponds to the measurement object information of the first network device.

In operation S470a, after the second network device receives the measurement result of the first network device reported by the terminal device, the second network device performs measurement evaluation.

In other words, the second network device determines, based on the measurement result reported by the terminal device, whether the inter-system handover of the terminal device occurs. For example, if the measurement result, of the measurement object of the first network device, measured by the terminal device within measurement duration indicated by the first network device or within measurement duration preconfigured in a network is greater than or equal to the quality threshold indicated by the first network device, the second network device may determine that an inter-system unnecessary handover of the terminal device occurs.

The quality threshold may be represented by RSRP, RSRQ, an SINR, or the like, and corresponds to the measurement result of the first network device. In operation S480, the second network device sends a handover report message to the first network device, where the handover report message includes indication information or the measurement result of the first network device.

The handover report message described herein may be corresponding to the second message in the method in FIG. 2. In this embodiment of this application, for ease of understanding, an example in which the second message is the handover report message is used for description.

Optionally, if the second network device determines that the inter-system unnecessary handover of the terminal device occurs in operation S470a, the handover report message sent by the second network device to the first network device in operation S480 may include indication information, and the indication information is used to indicate that the inter-system unnecessary handover of the terminal device occurs.

Optionally, the handover report message may further include the measurement result of the first network device. The measurement result of the first network device may include at least a list of SSBs of the first network device or a list of CSI-RSs of the first network device. Radio quality of all the SSBs or CSI-RSs is greater than or equal to a quality threshold within indicated measurement duration or preconfigured measurement duration.

Optionally, if the second network device determines, in operation S470a, that the inter-system unnecessary handover of the terminal device does not occur, operation S480 and subsequent operations may be omitted, or the second network device indicates, in the handover report message, that the inter-system unnecessary handover of the terminal device does not occur.

The foregoing operation S470a and operation S480 are specific to a case in which the second network device performs measurement evaluation on the measurement result. In another embodiment, the measurement evaluation on the first network device may alternatively be performed by the first network device, in other words, the first network device determines whether the inter-system unnecessary handover of the terminal device occurs, that is, as shown in operation S470b. In this case, the second network device may not perform operation S470a.

In this way, in operation S480, the handover report message sent by the second network device to the first network device includes the measurement result of the first network device reported by the terminal device. The first network device determines, based on the measurement result of the first network device, whether the inter-system unnecessary handover of the terminal device occurs. A manner in which the first network device performs measurement evaluation in operation S470b is similar to a manner in which the second network device performs measurement evaluation in operation S470a. For specific content, refer to related descriptions. Details are not described herein again. After operation S410 to operation S480, the first network device may determine whether the inter-system unnecessary handover of the terminal device occurs. In addition, the first network device obtains the measurement result of the measurement performed on the first network device by the terminal device, and the first network device may adjust an inter-system handover parameter based on the measurement result, to reduce occurrence of the inter-system handover, as described in operation S490.

In operation S490, after the first network device determines that the inter-system unnecessary handover of the terminal device occurs, the first network device may evaluate whether a related parameter of the inter-system handover may be adjusted.

The first network device may adjust the inter-system handover parameter of the first network device in a plurality of manners.

For example, the first network device may adjust a handover policy. For example, the first network device may increase a priority of a handover between measurement objects, such as SSBs, of a network device, to reduce a priority of the inter-system handover. In other words, increasing a priority of a handover between SSBs of a network device can enable the terminal device to be preferentially handed over under the first network device, thereby reducing a probability of the inter-system handover.

For example, the first network device may further adjust a handover threshold. The handover threshold in this embodiment of this application may be a handover threshold of the first network device. For example, increasing a threshold for performing an inter-system handover can reduce the probability of the inter-system handover.

In this embodiment of this application, the first network device may determine, based on an inter-system unnecessary handover result evaluated by the second network device or an inter-system unnecessary handover result evaluated by the first network device, whether the inter-system unnecessary handover of the terminal device occurs. Further, after determining that the inter-system unnecessary handover of the terminal device occurs, the first network device may further adjust the inter-system handover parameter, to reduce the inter-system unnecessary handover, thereby improving user experience and network resource utilization.

FIG. 5 is a schematic flowchart of a wireless network communication method according to still another embodiment of this application. The method may include operation S510 to operation S5100b.

In this embodiment of this application, operation S510 to operation S580 are consistent with operation S410 to operation S480 in the method in FIG. 4. For brevity, details are not described herein again. For detailed content, refer to the foregoing descriptions of operation S410 to operation S480 in FIG. 4. The following describes in detail operations after operation S580 with reference to the specific embodiment.

In operation S590, the first network device sends a handover threshold change request message to the second network device, where the handover threshold change request message is used to negotiate with the second network device about changing a handover threshold.

The handover threshold change request message described herein may be corresponding to the third message in the method in FIG. 3. In this embodiment of this application, for ease of understanding, an example in which the third message is the handover threshold change request message is used for description.

The handover threshold is a threshold for a network device to initiate a handover preparation procedure. In this embodiment of this application, the handover threshold that the first network device negotiates with the second network device about changing may be a second network device handover threshold.

The handover threshold change request message may indicate a second network device handover threshold recommended by the first network device. There are a plurality of indication manners. For example, an original second network device handover threshold is increased through negotiation between the first network device and the second network device.

It should be understood that the second network device handover threshold recommended by the first network device herein may be understood as a changed second network device handover threshold recommended by the first network device.

Optionally, the handover threshold change request message may include the second network device handover threshold recommended by the first network device, that is, a new handover threshold that is recommended by the first network device and that is set in the second network device. This new handover threshold may also be understood as the changed second network device handover threshold.

For example, the handover threshold change request may include an absolute value of the changed second network device handover threshold. For example, the handover threshold change request includes the absolute value 4 dB of the changed second network device handover threshold. In this case, when the terminal device detects that radio quality of the second network device is 4 dB greater than radio quality of the first network device, the first network device initiates a handover request to the second network device, to hand over the terminal device from the first network device to the second network device.

Optionally, the handover threshold change request may include a bias value of a specific cell or a specific SSB relative to an original second network device handover threshold. It may be understood as that the second network device handover threshold recommended by the first network device is equal to a sum of the original second network device handover threshold and the bias value. For example, the original second network device handover threshold is 4 dB, and the bias value of the specific cell such as a cell 1 relative to the original second network device handover threshold is 0.5 dB. In this case, when the terminal device detects that radio quality of the cell 1 of the second network device is 4.5 dB greater than radio quality of the first network device, the first network device initiates a handover request to the second network device, to hand over the terminal device from the first network device to the cell 1 of the second network device.

It should be understood that the specific cell herein may be any cell of the second network device. In this embodiment of this application, the cell 1 is merely used as an example, and does not constitute any limitation on this embodiment of this application.

Optionally, the handover threshold change request may include an offset value of the second network device handover threshold recommended by the first network device relative to the original second network device handover threshold. This offset value may be understood as an offset value of the changed second network device handover threshold relative to the original second network device handover threshold. For example, the handover threshold change request includes an offset value 0.5 dB of the changed second network device handover threshold relative to the original second network device handover threshold. This is equivalent to that the changed second network device handover threshold is 0.5 dB plus the original second network device handover threshold. For example, if the original second network device handover threshold is 4 dB, the changed second network device handover threshold is 4.5 dB. When the terminal device detects that the radio quality of the second network device is 4.5 dB greater than the radio quality of the first network device, the first network device initiates a handover request to the second network device, to hand over the terminal device from the first network device to the second network device.

It should be noted that, the offset value of the second network device handover threshold recommended by the first network device relative to the original second network device handover threshold may alternatively have another representation form, which is not limited to the offset value 0.5 dB listed above. For example, the handover threshold change request may include an integer value 2. This is equivalent to that the changed second network device handover threshold is 2*0.5 dB plus the original second network device handover threshold. If the original second network device handover threshold is 4 dB, the changed second network device handover threshold is 5 dB. The integer value is an integer, and may be specified in decimal, hexadecimal, or octal notation. An optional symbol − or + may be added before the integer value.

It should be understood that the specific values listed above are merely for ease of understanding, and do not constitute any limitation on this embodiment of this application.

It should be further understood that representation forms of the foregoing bias value and offset value may be positive or negative. In this embodiment of this application, only an example in which the offset value is positive is used for description. In some embodiments, both the offset value being positive or negative and a relationship between the second network device handover threshold recommended by the first network device and the offset value or the bias value may have other definitions, to adjust an inter-system handover parameter and reduce a probability of an inter-system handover.

After the second network device receives the handover threshold change request message sent by the first network device, the second network device may evaluate whether to accept the handover threshold change request.

If the second network device accepts the handover threshold change request, in operation S5100a, the second network device may send a handover threshold change acknowledgement message to the first network device.

Optionally, in addition, the second network device may change the original second network device handover threshold based on information in the handover threshold change request.

If the second network device does not accept the handover threshold change request, in operation S5100b, the second network device may send a handover threshold change failure message to the first network device.

Optionally, the handover threshold change failure message may further include a handover threshold change value or change range allowed by the second network device.

The handover threshold change acknowledgement message or the handover threshold change failure message described herein may correspond to the fourth message in the method in FIG. 3. In this embodiment of this application, for ease of understanding, an example in which the third message is the handover threshold change acknowledgement message or the handover threshold change failure message is used for description. Optionally, when the first network device negotiates with the second network device about changing the handover threshold of the second network device, the first network device may also adjust a handover parameter of the first network device, for example, perform the change according to operation S490 in FIG. 4.

In this embodiment of this application, the first network device may determine, based on an inter-system unnecessary handover result evaluated by the second network device or an inter-system unnecessary handover result evaluated by the first network device, whether the inter-system unnecessary handover of the terminal device occurs. Further, after determining that the inter-system unnecessary handover of the terminal device occurs, the first network device may further negotiate with the second network device about changing the second network device handover threshold. Still further, the first network device may also adjust the inter-system handover parameter of the first network device, to reduce the inter-system unnecessary handover, thereby improving user experience and network resource utilization.

FIG. 6 is a schematic flowchart of a wireless network communication method according to still another embodiment of this application. The method may include operation S610 to operation S690.

In this embodiment of this application, operation S610 to operation S680 are consistent with operation S410 to operation S480 in the method in FIG. 4. For brevity, details are not described herein again. For detailed content, refer to the foregoing descriptions of operation S410 to operation S480 in FIG. 4. The following describes in detail operations after operation S680 with reference to the specific embodiment.

After the first network device determines that the inter-system unnecessary handover of the terminal device occurs, the first network device may evaluate whether a related parameter of an inter-system measurement event may be adjusted. If the first network device determines, through evaluation, that the related parameter of the inter-system measurement event needs to be adjusted, in operation S690, the first network device sends a measurement report configuration message to a terminal device that camps on the first network device and that is not handed over, to adjust the related parameter of the inter-system measurement event.

The inter-system handover occurs usually because an inter-system measurement event is triggered. Therefore, reducing a quantity of times of triggering an inter-system measurement event can reduce a probability of the inter-system handover.

The inter-system measurement event may usually include an event B1 and an event B2. The event B1 indicates that B1 triggers an inter-system handover request when signal quality of an inter-system neighbor is greater than a threshold. The event B2 indicates that B2 triggers an inter-system handover request when signal quality of a serving cell is less than a threshold and signal quality of an inter-system neighbor is greater than a threshold.

A plurality of related parameters of the inter-system measurement event may be adjusted.

For example, the first network device may adjust an inter-system measurement event trigger hysteresis parameter. Increasing a value of the event trigger hysteresis parameter can reduce a quantity of times of triggering an inter-system measurement event due to radio signal fluctuation, thereby reducing a ping-pong handover and a decision error. For example, the measurement report configuration message may include a trigger hysteresis parameter of the event B1 or the event B2, and a value of this trigger hysteresis parameter is increased relative to the originally-set trigger hysteresis parameter.

For example, the first network device may adjust an inter-system neighbor cell offset amount. The inter-system neighbor cell offset amount may control difficulty of occurrence of an inter-system measurement event. Reducing a value of the inter-system neighbor cell offset amount increases the difficulty of occurrence of an inter-system measurement event. For example, the measurement report configuration message may include an inter-system neighbor cell offset amount of the event B1 or the event B2, and this inter-system neighbor cell offset amount is reduced relative to the originally-set inter-system neighbor cell offset amount.

For example, the first network device may further adjust an inter-system measurement event threshold. Increasing a value of the inter-system measurement event threshold can reduce the quantity of times of triggering an inter-system measurement event. For example, the measurement report configuration message may include a minimum threshold (namely, the inter-system measurement event threshold) for triggering an inter-system measurement event, and the inter-system measurement event threshold is increased relative to the originally-set inter-system measurement event threshold.

Optionally, the first network device may adjust any one or more of the parameters listed above.

Optionally, when adjusting the inter-system measurement event parameter, the first network device may further negotiate with the second network device about changing the second network device handover threshold or adjust the inter-system handover parameter of the first network device.

For a specific adjustment manner, refer to the foregoing related descriptions in FIG. 4 and FIG. 5. Details are not described herein again.

In this embodiment of this application, the first network device may determine, based on an inter-system unnecessary handover result evaluated by the second network device or an inter-system unnecessary handover result evaluated by the first network device, whether the inter-system unnecessary handover of the terminal device occurs. Further, after determining that the inter-system unnecessary handover of the terminal device occurs, the first network device may further adjust the inter-system measurement event parameter, to reduce a quantity of times of triggering the inter-system measurement event, thereby reducing the inter-system unnecessary handover, so that user experience and network resource utilization can be improved.

It should be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application.

The foregoing describes in detail the method embodiments in the embodiments of this application with reference to FIG. 1 to FIG. 6. The following describes in detail apparatus embodiments in the embodiments of this application with reference to FIG. 7 to FIG. 12. It should be understood that the descriptions of the method embodiments correspond to descriptions of the apparatus embodiments. Therefore, for parts that are not described in detail, refer to the descriptions in the foregoing method embodiments.

Figure 7:
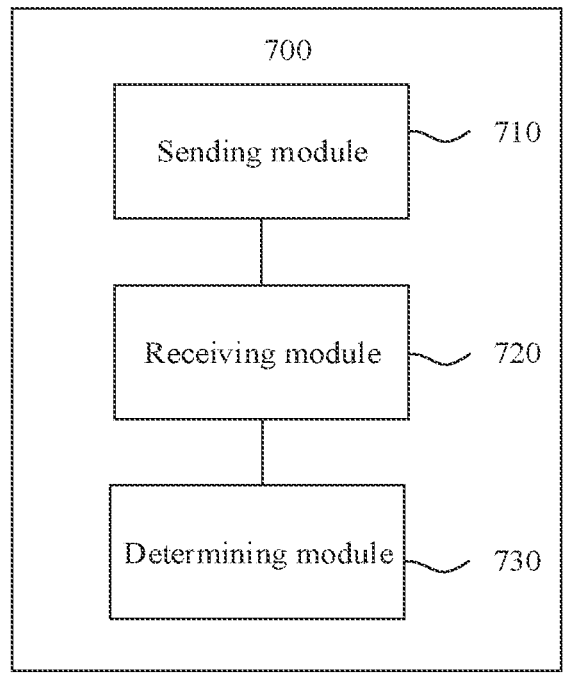
FIG. 7 is a schematic structural diagram of a network device according to an embodiment of this application.

FIG. 7 is a schematic structural diagram of a network device 700 according to an embodiment of this application. The network device 700 in FIG. 7 may be the first network device mentioned above. The network device 700 may be configured to implement the foregoing operations performed by the first network device. The network device 700 includes a sending module 710, a receiving module 720, and a determining module 730.

The sending module 710 is configured to send a first message to a second network device, where the first message includes measurement object information of the network device 700.

The receiving module 720 is configured to receive a second message sent by the second network device, where the second message includes indication information or measurement result information that is of the network device 700, and the indication information is used to indicate whether an inter-system unnecessary handover of a terminal device occurs.

The determining module 730 is configured to determine, based on the second message, whether the inter-system unnecessary handover of the terminal device occurs.

Optionally, the network device 700 may further include an adjustment module, configured to adjust an inter-system handover parameter when the inter-system unnecessary handover of the terminal device occurs.

Optionally, the adjustment module is configured to adjust a handover policy or a first network device handover threshold.

Optionally, the network device 700 may further include: a negotiation module, configured to negotiate with the second network device about changing a second network device handover threshold.

Optionally, the negotiation module is specifically configured to send a third message to the second network device, where the third message is used to indicate a second network device handover threshold recommended by the network device 700.

Optionally, the negotiation module is specifically configured to receive a fourth message sent by the second network device, where the fourth message is used to indicate whether the second network device accepts the second network device handover threshold recommended by the network device 700.

Optionally, the third message includes any one of the following information:
  the second network device handover threshold recommended by the network device 700;
  a bias value of a specific cell or a specific synchronization signal and physical broadcast channel block SSB relative to an original second network device handover threshold; or
  an offset value of the second network device handover threshold recommended by the network device 700 relative to an original second network device handover threshold.

Optionally, when the fourth message indicates that the second network device does not accept the second network device handover threshold recommended by the network device 700, the fourth message includes a handover threshold change range allowed by the second network device.

Optionally, the adjusting module is configured to adjust an inter-system measurement event parameter.

Optionally, the adjustment module is specifically configured to send a fifth message to the terminal device that camps on the network device 700, where the fifth message is used to indicate an adjusted inter-system measurement event parameter.

Optionally, the inter-system measurement event parameter includes at least one of the following information: an inter-system measurement event trigger hysteresis parameter, an inter-system neighbor cell offset amount, or an inter-system measurement event threshold.

Optionally, the second message includes the measurement result information of the network device 700, and the determining module 730 is configured to determine whether a measurement result in the measurement result information of the network device 700 is not less than a quality threshold. When the measurement result is greater than or equal to the quality threshold, the network device 700 determines that the inter-system unnecessary handover of the terminal device occurs.

Optionally, the first message further includes measurement duration for performing measurement on the network device 700 by the terminal device, or a quality threshold for allowing the second network device to send the measurement result information of the network device 700 to the network device 700.

It should be understood that the quality threshold in the embodiments of this application may be understood as a threshold for determining that the inter-system unnecessary handover of the terminal device occurs.

Optionally, the first message further includes measurement duration for performing measurement on the first network device by the terminal device, the second message includes measurement result information of the first network device, and the determining module 730 is configured to determine whether the measurement result in the measurement result information of the network device 700 is not less than a quality threshold within the measurement duration. When the measurement result is greater than or equal to the quality threshold within the measurement duration, the network device 700 determines that the inter-system unnecessary handover of the terminal device occurs.

Optionally, the first message is a handover request message.

Optionally, the measurement object information includes at least one of the following parameters: a physical cell identifier PCI corresponding to the SSB of the network device 700, a frequency of the SSB of the network device 700, a new radio cell global identifier NCGI corresponding to the SSB of the network device 700, or a channel state information-reference signal CSI-RS of the network device 700.

Figure 8:
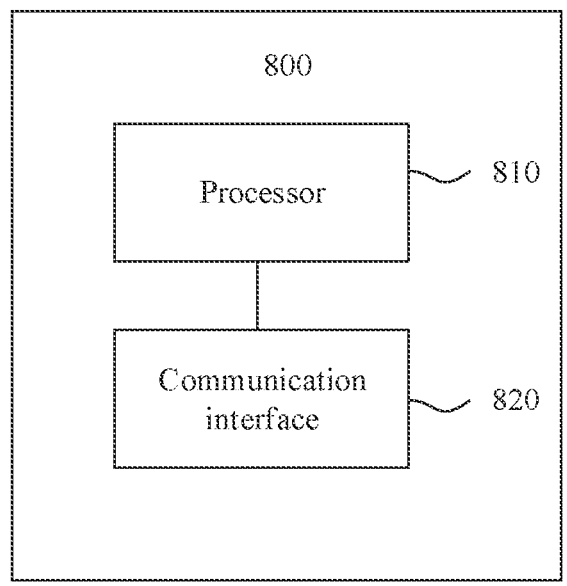
FIG. 8 is a schematic structural diagram of a communication apparatus according to an embodiment of this application.

FIG. 8 is a schematic structural diagram of a communication apparatus 800 according to an embodiment of this application. The communication apparatus 800 shown in FIG. 8 may correspond to the first network device described above. The communication apparatus 800 may include at least one processor 810 and a communication interface 820. The communication interface 820 may be used by the communication apparatus 800 to exchange information with another communication apparatus. When program instructions are executed in the at least one processor 810, the communication apparatus 800 is enabled to implement the foregoing operations, methods, operations, or functions performed by the first network device.

Figure 9:
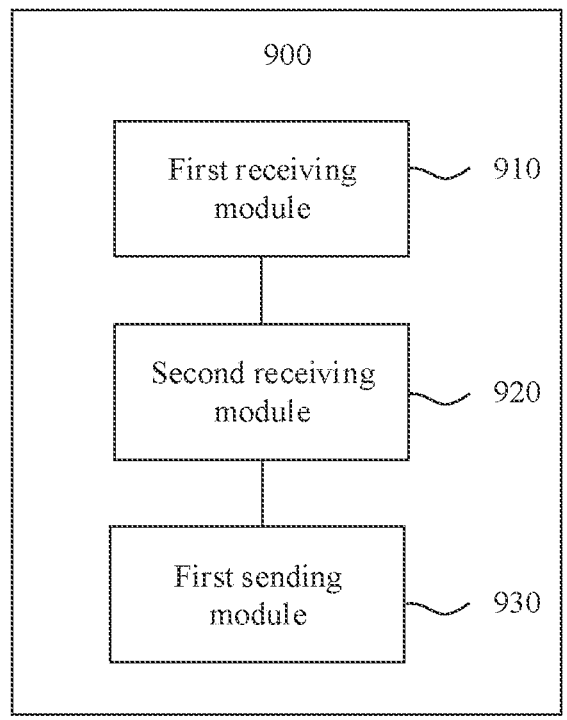
FIG. 9 is a schematic structural diagram of a network device according to another embodiment of this application.

FIG. 9 is a schematic structural diagram of a network device 900 according to another embodiment of this application. The network device 900 in FIG. 9 may be the second network device mentioned above. The network device 900 may be configured to implement the foregoing operations performed by the second network device. The network device 900 includes a first receiving module 910, a second receiving module 920, and a first sending module 930.

The first receiving module 910 is configured to receive a first message sent by a first network device, where the first message includes measurement object information of the first network device;

The second receiving module 920 is configured to receive measurement result information of the first network device sent by a terminal device.

The first sending module 930 is configured to send a second message to the first network device, where the second message includes indication information or the measurement result information that is of the first network device, and the indication information is used to indicate whether an inter-system unnecessary handover of the terminal device occurs.

Optionally, the network device 900 may further include: a negotiation module, configured to: when the inter-system unnecessary handover of the terminal device occurs, negotiate with the first network device about changing a network device 900 handover threshold.

It should be understood that the handover threshold in the embodiments of this application may be understood as a threshold for initiating a handover preparation procedure by a network device.

Optionally, the negotiation module is specifically configured to receive a third message sent by the first network device, where the third message is used to indicate a network device 900 handover threshold recommended by the first network device.

Optionally, the negotiation module is specifically configured to send a fourth message to the first network device, where the fourth message is used to indicate whether the network device 900 accepts the network device 900 handover threshold recommended by the first network device.

Optionally, the third message includes any one of the following information:
the network device 900 handover threshold recommended by the first network device;
a bias value of a specific cell or a specific synchronization signal and physical broadcast channel block SSB relative to an original network device 900 handover threshold; or
an offset value of the network device 900 handover threshold recommended by the first network device relative to an original network device 900 handover threshold.

Optionally, when the fourth message indicates that the network device 900 does not accept the network device 900 handover threshold recommended by the first network device, the fourth message includes a handover threshold change range allowed by the second network device.

Optionally, the network device 900 may further include a second sending module, configured to send, to the terminal device, the measurement object information of the first network device or measurement duration for performing measurement on the first network device by the terminal device.

Optionally, the network device 900 may further include: a determining module, configured to: determine whether a measurement result in the measurement result information of the first network device is not less than a quality threshold; and when the measurement result is greater than or equal to the quality threshold, determine that the inter-system unnecessary handover of the terminal device occurs.

Optionally, the determining module is configured to: determine whether the measurement result in the measurement result information of the first network device is not less than a quality threshold within the measurement duration for performing measurement on the first network device by the terminal device; and when the measurement result is greater than or equal to the quality threshold within the measurement duration, determine that the inter-system unnecessary handover of the terminal device occurs.

Optionally, the first message further includes measurement duration for performing measurement on the first network device by the terminal device, and/or a quality threshold for allowing the network device 900 to send the measurement result information of the first network device to the first network device.

Optionally, the first message is a handover request message.

Optionally, the measurement object information includes at least one of the following parameters: a physical cell identifier PCI corresponding to the SSB of the first network device, a frequency of the SSB of the first network device, a new radio cell global identifier NCGI corresponding to the SSB of the first network device, or a channel state information-reference signal CSI-RS of the first network device.

Figure 10:
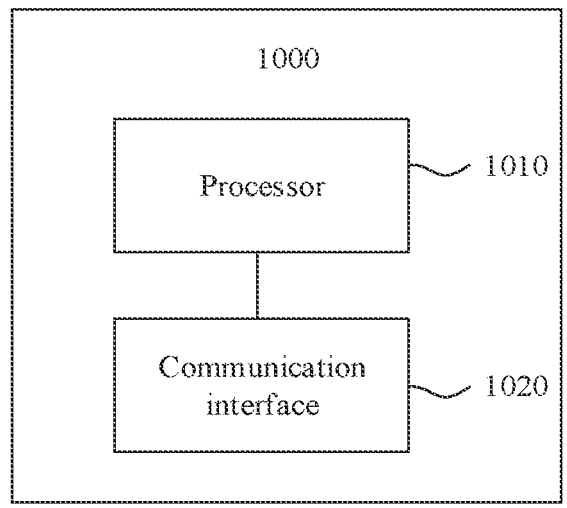
FIG. 10 is a schematic structural diagram of a communication apparatus according to another embodiment of this application.

FIG. 10 is a schematic structural diagram of a communication apparatus according to another embodiment of this application. The communication apparatus 1000 shown in FIG. 10 may correspond to the second network device described above. The communication apparatus 1000 may include at least one processor 1010 and a communication interface 1020. The communication interface 1020 may be used by the communication apparatus 1000 to exchange information with another communication apparatus. When program instructions are executed in the at least one processor 1010, the communication apparatus 1000 is enabled to implement the foregoing operations, methods, operations, or functions performed by the second network device.

Figure 11:
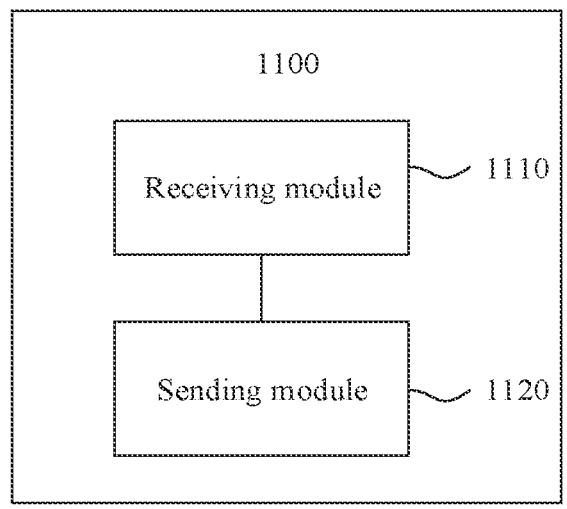
FIG. 11 is a schematic structural diagram of a terminal device according to an embodiment of this application.

FIG. 11 is a schematic structural diagram of a terminal device according to an embodiment of this application. The terminal device 1100 in FIG. 11 may be the terminal device mentioned above. The terminal device 1100 may be configured to implement the foregoing operations performed by the terminal device. The terminal device 1100 includes a receiving module 1110 and a sending module 1120.

The receiving module 1110 is configured to receive measurement object information of a first network device.

The sending module 1120 is configured to send measurement result information of the first network device to a second network device.

Optionally, the terminal device 1100 may further include a measurement module, configured to perform measurement on the first network device based on the measurement object information of the first network device.

Optionally, the receiving module 1110 is specifically configured to receive the measurement object information of the first network device sent by the second network device.

Optionally, the receiving module 1110 is configured to receive measurement duration for performing measurement on the first network device.

Figure 12:
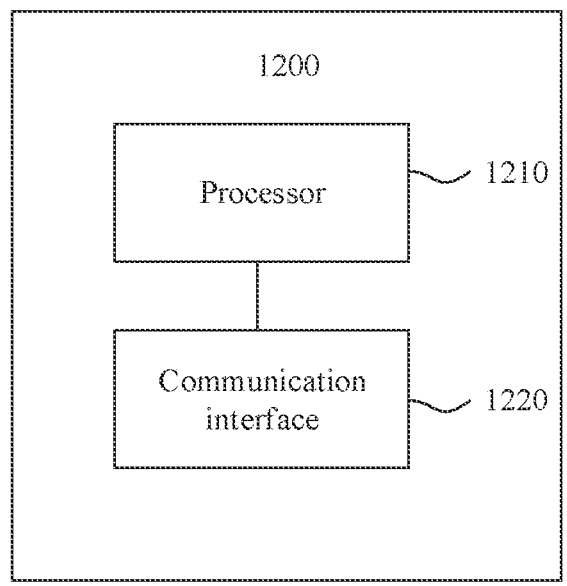
FIG. 12 is a schematic structural diagram of a communication apparatus according to an embodiment of this application.

FIG. 12 is a schematic structural diagram of a communication apparatus according to an embodiment of this application. The communication apparatus 1200 shown in FIG. 12 may correspond to the terminal device described above. The communication apparatus 1200 may include at least one processor 1210 and a communication interface 1220. The communication interface 1220 may be used by the communication apparatus 1200 to exchange information with another communication apparatus. When program instructions are executed in the at least one processor 1210, the communication apparatus 1200 is enabled to implement the foregoing operations, methods, operations, or functions performed by the terminal device.

A person of ordinary skill in the art may be aware that, units and algorithm operations in examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A wireless network communication method, comprising:
   sending, by a first network device to a second network device, a request message to negotiate about changing a handover threshold of a synchronization signal and physical broadcast channel block (SSB) of the second network device, wherein the request message comprises bias information of the SSB; and
   receiving, by the first network device from the second network device, a feedback message that indicates whether the second network device accepts the bias information of the SSB.

2. The method according to claim 1, wherein the bias information of the SSB comprises an offset value, and the offset value is an integer value.

3. The method according to claim 1, wherein when the feedback message indicates that the second network device does not accept the bias information of the SSB, the feedback message indicates a handover threshold change range of the SSB allowed by the second network device.

4. The method according to claim 1, wherein:
   when the feedback message indicates that the second network device accepts the bias information of the SSB, the feedback message is an acknowledge message; or when the feedback message indicates that the second
network device does not accept the bias information of
the SSB, the feedback message is a failure message.

5. The method according to claim 1, wherein the SSB
corresponds to a target cell of the second network device,
and the target cell comprises a plurality of synchronization
signal and physical broadcast channel blocks (SSBs).

6. The method according to claim 1, wherein before
sending, by the first network device to the second network
device, the request message, the method further comprises:
sending, by the first network device to the second network
device, a first message, wherein the first message
comprises measurement object information of the first
network device, a measurement duration for performing measurement on the first network device by a
terminal device, and a quality threshold for allowing
the second network device to send measurement result
information of the first network device to the first
network device, and wherein the measurement object
information of the first network device comprises at
least one of a physical cell identifier (PCI) corresponding to the SSB of the first network device, a frequency
corresponding to the SSB of the first network device, or
a new radio cell global identifier (NCGI) corresponding
to the SSB of the first network device;
receiving, by the first network device from the second
network device, a second message, wherein the second
message comprises indication information or the measurement result information of the first network device,
the indication information indicates that an inter-system unnecessary handover of the terminal device
occurs, and the measurement result information of the
first network device indicates that a result measured by
the terminal device and on the first network device
during the measurement duration is greater than or
equal to a quality threshold; and
determining, by the first network device based on the
second message, that the inter-system unnecessary handover of the terminal device occurs.

7. The method according to claim 1, further comprising:
adjusting, by the first network device, a handover policy
or a handover threshold of a SSB of the first network
device, wherein the handover policy comprises:
increasing a priority of a handover between a plurality
of synchronization signal and physical broadcast
channel blocks (SSBs) of the first network device; or
decreasing a priority of an inter-system handover; or
adjusting, by the first network device, an inter-system
measurement event parameter, wherein the inter-system measurement event parameter comprises at least
one of an inter-system measurement event trigger hysteresis parameter, an inter-system neighbor cell offset
amount, or an inter-system measurement event threshold.

8. The method according to claim 7, wherein adjusting, by
the first network device, the inter-system measurement event
parameter comprises:
sending, by the first network device to a terminal device
that camps on the first network device, a fifth message,
wherein the fifth message indicates an adjusted intersystem measurement event parameter.

9. A wireless network communication method, comprising:
receiving, by a second network device from a first network device, a request message to negotiate about
changing a handover threshold of a synchronization
signal and physical broadcast channel block (SSB) of
the second network device, wherein the request message comprises bias information of the SSB; and
sending, by the second network device to the first network
device, a feedback message that indicates whether the
second network device accepts the bias information of
the SSB.

10. The method according to claim 9, wherein the bias
information of the SSB comprises an offset value, and the
offset value is an integer value.

11. The method according to claim 9, wherein when the
feedback message indicates that the second network device
does not accept the bias information of the SSB, the feedback message indicates a handover threshold change range
of the SSB allowed by the second network device.

12. The method according to claim 9, wherein:
when the feedback message indicates that the second
network device accepts the bias information of the
SSB, the feedback message is an acknowledge message; or
when the feedback message indicates that the second
network device does not accept the bias information of
the SSB, the feedback message is a failure message.

13. The method according to claim 9, wherein the SSB
corresponds to a target cell of the second network device,
and the target cell comprises a plurality of synchronization
signal and physical broadcast channel blocks (SSBs).

14. The method according to claim 9, wherein before
receiving, by the second network device from the first
network device, the request message, the method further
comprises:
receiving, by the second network device from the first
network device, a first message, wherein the first message comprises measurement object information of the
first network device, a measurement duration for performing measurement on the first network device by a
terminal device, and a quality threshold for allowing
the second network device to send measurement result
information of the first network device to the first
network device, and wherein the measurement object
information of the first network device comprises at
least one of a physical cell identifier (PCI) corresponding to the SSB of the first network device, a frequency
corresponding to the SSB of the first network device, or
a new radio cell global identifier (NCGI) corresponding
to the SSB of the first network device;
sending, by the second network device to the terminal
device, the measurement object information of the first
network device and the measurement duration for performing measurement on the first network device by
the terminal device;
receiving, by the second network device from the terminal
device, a result measured by the terminal device and on
the first network device during the measurement duration;
determining, by the second network device, whether the
result measured by the terminal device and on the first
network device during the measurement duration is not
less than the quality threshold; and
when the result measured by the terminal device and on
the first network device during the measurement duration is greater than or equal to the quality threshold,
sending, by the second network device to the first
network device, a second message, wherein the second
message comprises indication information or the measurement result information of the first network device,
the indication information indicates that an inter-system unnecessary handover of the terminal device occurs, and the measurement result information of the first network device indicates that the result measured by the terminal device and on the first network device during the measurement duration is greater than or equal to a quality threshold.

15. A first network device, comprising:
a transceiver;
at least one processor; and
one or more memories coupled to the at least one processor and storing programming instructions for execution by the at least one processor to cause the first network device to perform operations comprising:
sending a request message to a second network device to negotiate about changing a handover threshold of a synchronization signal and physical broadcast channel block (SSB) of the second network device, wherein the request message comprises bias information of the SSB; and
receiving a feedback message from the second network device, wherein the feedback message indicates whether the second network device accepts the bias information of the SSB.

16. The first network device according to claim 15, wherein the bias information of the SSB comprises an offset value, and the offset value is an integer value.

17. The first network device according to claim 15, wherein when the feedback message indicates that the second network device does not accept the bias information of the SSB, the feedback message indicates a handover threshold change range of the SSB allowed by the second network device.

18. The first network device according to claim 15, wherein:
when the feedback message indicates that the second network device accepts the bias information of the SSB, the feedback message is an acknowledge message; or
when the feedback message indicates that the second network device does not accept the bias information of the SSB, the feedback message is a failure message.

19. The first network device according to claim 15, wherein the SSB corresponds to a target cell of the second network device, and the target cell comprises a plurality of synchronization signal and physical broadcast channel blocks (SSBs).

20. The first network device according to claim 15, wherein before sending the request message to the second network device, the operations further comprise:
sending a first message to the second network device, wherein the first message comprises measurement object information of the first network device, a measurement duration for performing measurement on the first network device by a terminal device, and a quality threshold for allowing the second network device to send measurement result information of the first network device to the first network device, and wherein the measurement object information of the first network device comprises at least one of a physical cell identifier (PCI) corresponding to the SSB of the first network device, a frequency corresponding to the SSB of the first network device, or a new radio cell global identifier (NCGI) corresponding to the SSB of the first network device;
receiving a second message from the second network device, wherein the second message comprises indication information or the measurement result information of the first network device, the indication information indicates that an inter-system unnecessary handover of the terminal device occurs, and the measurement result information of the first network device indicates that a result measured by the terminal device and on the first network device during the measurement duration is greater than or equal to a quality threshold; and
determining, based on the second message, that the inter-system unnecessary handover of the terminal device occurs.

21. The first network device according to claim 15, wherein the operations further comprise:
adjusting a handover policy or a handover threshold of a SSB of the first network device, wherein the handover policy comprises:
increasing a priority of a handover between a plurality of synchronization signal and physical broadcast channel blocks (SSBs) of the first network device; or
decreasing a priority of an inter-system handover; or
adjusting an inter-system measurement event parameter, wherein the inter-system measurement event parameter comprises at least one of an inter-system measurement event trigger hysteresis parameter, an inter-system neighbor cell offset amount, or an inter-system measurement event threshold.

22. The first network device according to claim 21, wherein adjusting the inter-system measurement event parameter comprises:
sending a fifth message to a terminal device that camps on the first network device, wherein the fifth message indicates an adjusted inter-system measurement event parameter.

23. A second network device, comprising:
a transceiver;
at least one processor; and
one or more memories coupled to the at least one processor and storing programming instructions for execution by the at least one processor to cause the second network device to perform operations comprising:
receiving a request message from a first network device to negotiate about changing a handover threshold of a synchronization signal and physical broadcast channel block (SSB) of the second network device, wherein the request message comprises bias information of the SSB; and
sending a feedback message to the first network device, wherein the feedback message indicates whether the second network device accepts the bias information of the SSB.

24. The second network device according to claim 23, wherein the bias information of the SSB comprises an offset value, and the offset value is an integer value.

25. The second network device according to claim 23, wherein when the feedback message indicates that the second network device does not accept the bias information of the SSB, the feedback message indicates a handover threshold change range of the SSB allowed by the second network device.

26. The second network device according to claim 23, wherein:
when the feedback message indicates that the second network device accepts the bias information of the SSB, the feedback message is an acknowledge message; or
when the feedback message indicates that the second network device does not accept the bias information of the SSB, the feedback message is a failure message.

27. The second network device according to claim 23, wherein the SSB corresponds to a target cell of the second network device, and the target cell comprises a plurality of synchronization signal and physical broadcast channel blocks (SSBs).

28. The second network device according to claim 23, wherein before receiving, by the second network device from the first network device, the request message, the operations further comprise:
receiving a first message from the first network device, wherein the first message comprises measurement object information of the first network device, a measurement duration for performing measurement on the first network device by a terminal device, and a quality threshold for allowing the second network device to send measurement result information of the first network device to the first network device, and wherein the measurement object information of the first network device comprises at least one of a physical cell identifier (PCI) corresponding to the SSB of the first network device, a frequency corresponding to the SSB of the first network device, or a new radio cell global identifier (NCGI) corresponding to the SSB of the first network device;
sending, to the terminal device, the measurement object information of the first network device and the measurement duration for performing measurement on the first network device by the terminal device;
receiving, from the terminal device, a result measured by the terminal device and on the first network device during the measurement duration;
determining whether the result measured by the terminal device and on the first network device during the measurement duration is not less than the quality threshold; and
when the result measured by the terminal device and on the first network device during the measurement duration is greater than or equal to the quality threshold, sending a second message to the first network device, wherein the second message comprises indication information or the measurement result information of the first network device, the indication information indicates that an inter-system unnecessary handover of the terminal device occurs, and the measurement result information of the first network device indicates that the result measured by the terminal device and on the first network device during the measurement duration is greater than or equal to a quality threshold.

* * * * *